US012072415B2

(12) United States Patent
Kim

(10) Patent No.: US 12,072,415 B2
(45) Date of Patent: Aug. 27, 2024

(54) DETERMINING METHOD AND APPARATUS FOR OBSTACLES AROUND THE PARKING PATH AND SURROUNDING USING ULTRASONIC WAVES

(71) Applicant: HYUNDAI MOBIS CO., LTD., Seoul (KR)

(72) Inventor: Kang Hee Kim, Goyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 189 days.

(21) Appl. No.: 17/653,246

(22) Filed: Mar. 2, 2022

(65) Prior Publication Data
US 2023/0168374 A1    Jun. 1, 2023

(51) Int. Cl.
  *G01S 15/931* (2020.01)
  *G01S 7/539* (2006.01)
  *G01S 15/46* (2006.01)

(52) U.S. Cl.
  CPC ............ *G01S 15/931* (2013.01); *G01S 7/539* (2013.01); *G01S 15/46* (2013.01); *G01S 2015/932* (2013.01)

(58) Field of Classification Search
  CPC .... G01S 2015/932; G01S 15/46; G01S 7/539; G01S 15/931
  See application file for complete search history.

(56) References Cited

U.S. PATENT DOCUMENTS

| 6,396,435 B1 * | 5/2002 | Fleischhauer | G01S 15/42 |
| | | | 342/72 |
| 2016/0116585 A1 * | 4/2016 | Fukuman | G01S 15/878 |
| | | | 367/99 |
| 2017/0242121 A1 | 8/2017 | Tanaka | |

FOREIGN PATENT DOCUMENTS

| DE | 102019218067 A1 * | 5/2021 |
| JP | 2013-209063 | 10/2013 |
| JP | 2018-122619 | 8/2018 |
| JP | 2019-128347 | 8/2019 |
| JP | 68-73353 | 4/2021 |
| KR | 2020-0096353 | 8/2020 |

OTHER PUBLICATIONS

Extended European Search Report dated Sep. 27, 2022 issued in EP 22163404.1.
Korean Notice of Allowance dated Apr. 25, 2024 issued in KR 10-2021-0170128.

* cited by examiner

*Primary Examiner* — Isam A Alsomiri
*Assistant Examiner* — Abdallah Abulaban
(74) *Attorney, Agent, or Firm* — DLA Piper LLP US

(57) ABSTRACT

A determining method for obstacles includes determining whether an ultrasonic noise exists in TOF of an ultrasonic wave reflected by an object and received; generating a virtual object on an outline of a parking path that a vehicle is to move on based on the received ultrasonic wave TOF; generating virtual indirect wave TOF using the virtual object; and determining whether the object is located inside or outside the outline of the parking path by comparing real indirect wave TOF, which is indirect wave TOF among the received ultrasonic wave TOFs, with the virtual indirect wave TOF.

11 Claims, 36 Drawing Sheets

FIG. 19

| | | | REAL INDIRECT WAVE − IDEAL INDIRECT WAVE | | |
|---|---|---|---|---|---|
| F | REFERENCE DISTANCE | REFERENCE OFFSET | Min | Max | P_max |
| 20cm | 1.8m | 0 | 0 | 0.018 | 0.011 |
| | 1.8m | 0.1 | 0.01 | 0.026 | 0.018 |
| | 1.2m | 0 | 0 | 0.02 | 0.012 |
| | 1.2m | 0.1 | 0.013 | 0.035 | 0.024 |
| 30cm | 1.8m | 0 | 0 | 0.027 | 0.015 |
| | 1.8m | 0.1 | 0.01 | 0.035 | 0.018 |
| | 1.2m | 0 | 0 | 0.035 | 0.024 |
| | 1.2m | 0.1 | 0.015 | 0.045 | 0.029 |
| 50cm | 1.8m | 0 | 0 | 0.043 | 0.028 |
| | 1.8m | 0.1 | 0.01 | 0.05 | 0.03 |
| | 1.2m | 0 | 0 | 0.055 | 0.027 |
| | 1.2m | 0.1 | 0.015 | 0.063 | 0.032 |

DETERMINING METHOD AND APPARATUS FOR OBSTACLES AROUND THE PARKING PATH AND SURROUNDING USING ULTRASONIC WAVES

CROSS REFERENCE TO RELATED APPLICATION

The present application claims priority to Korean Patent Application No. 10-2021-0170128, filed Dec. 1, 2021, the entire contents of which is incorporated herein for all purposes by this reference.

BACKGROUND OF THE INVENTION

Field of the Invention

The present invention relates to a technology for determining whether an obstacle on and around a parking path is located in the parking path of the vehicle using ultrasonic waves.

Description of the Related Art

A plurality of ultrasonic sensors are mounted in a vehicle for detecting objects close to the vehicle in a situation such as parking.

For example, a plurality of ultrasonic sensors are installed to be horizontally spaced apart from each other on a front bumper, a rear bumper, and the like of the vehicle.

The ultrasonic sensors detect objects by emitting ultrasonic waves and then receiving the ultrasonic waves reflected by the objects.

The matters described above as a technical background are intended only for a better understanding of the background of the present invention and are not to be taken as acknowledgment that they pertain to the conventional art already known to those skilled in the art.

SUMMARY OF THE INVENTION

An object of the present invention is to provide a determining method and apparatus for obstacles on and around a parking path using ultrasonic waves for determining whether an obstacle on and around a parking path that a vehicle is to move on for parking exists inside or outside the parking path of the vehicle using ultrasonic sensors mounted in the vehicle, thereby allowing execution of smoother and safer parking.

In order to achieve the object described above, a determining method for obstacles on and around a parking path using ultrasonic waves according to the present invention includes determining whether an ultrasonic noise exists in the time of flights (TOFs) of the ultrasonic waves reflected by an object and received; generating a virtual object on an outline of the parking path that the vehicle is to move on based on the received ultrasonic wave TOF when no ultrasonic noise exists; generating virtual indirect wave TOF using the virtual object; and determining whether the object is located inside or outside the outline of the parking path by comparing a real indirect wave TOF, which is indirect wave TOF among the received ultrasonic wave TOFS, with the virtual indirect wave TOF.

In the determining of whether an ultrasonic noise exists, it may be determined that no ultrasonic noise exists when both the direct wave TOF and the indirect wave TOF exist and neither a dynamic noise nor a static noise exists in the received ultrasonic wave TOFs.

It may be determined that the dynamic noise is generated when $$d(\text{direct wave } h\text{TOF}) > Vdt$$

where direct wave $h\text{TOF}$ = direct wave TOF/2, $d(\text{direct wave } h\text{TOF})$ = direct wave $h\text{TOF}_{t=n}$ − direct wave $h\text{TOF}_{t=n-1}$ [m], V: vehicle speed, and dt: ultrasonic update cycle [ms].

It may be determined that the static noise is generated when $$|\text{direct wave } h\text{TOF} - \text{indirect wave } h\text{TOF}| > \text{distance between sensors}/2$$

where $h\text{TOF} = \text{TOF}/2$ and distance between sensors: distance between a sensor emitting and receiving a direct wave and a sensor receiving an indirect wave.

The virtual object may be generated at an intersection at which a circle having the center at a position of the sensor emitting and receiving the direct wave and the radius of the direct wave hTOF crosses the outline of the parking path.

The virtual indirect wave TOF may be calculated as the sum of a straight line connecting the position of the sensor emitting and receiving the direct wave to the virtual object and a straight line connecting the virtual object to the position of the sensor receiving the indirect wave.

In the determining of whether the object is located inside or outside the outline of the parking path, when the sensor emitting and receiving the direct wave is located on an outer side of the parking path, compared with the sensor receiving the indirect wave, it may be determined that the object is located outside the outline of the parking path if the real indirect wave TOF is greater than the virtual indirect wave TOF and that the object is located inside the outline of the parking path if the real indirect wave TOF is equal to or less than the virtual indirect wave TOF.

A plurality of sensors mounted in the vehicle may sequentially emit ultrasonic waves and the steps described above may be repeatedly performed for two adjacent sensors each time ultrasonic waves are emitted from the respective sensors.

In addition, in order to achieve the object described above, determining apparatus for obstacles on and around the parking path using ultrasonic waves according to the present invention may include a noise determination unit determining whether an ultrasonic noise exists in the TOF of the ultrasonic wave reflected by an object and received; a virtual object generation unit generating a virtual object on an outline of a parking path that the vehicle is to move on based on the received ultrasonic wave TOF when the noise determination unit determines that no ultrasonic noise exists; a virtual indirect wave generation unit generating a virtual indirect wave TOF using the virtual object generated by the virtual object generation unit; and an object location determination unit determining whether the object exists inside or outside the outline of the parking path by comparing the real indirect wave TOF, which is indirect wave TOF among the received ultrasonic wave TOFs, with the virtual indirect wave TOF generated by the virtual indirect wave generation unit.

The noise determination unit may be configured to include a dynamic noise determination unit and a static noise determination unit and determine that no ultrasonic noise exists when both the direct wave TOF and the indirect wave TOF exist and neither the dynamic noise nor the static noise exists in the received ultrasonic wave TOF.

The dynamic noise determination unit may be configured to determine that the dynamic noise is generated when $$d(\text{direct wave } h\text{TOF}) > Vdt$$

where direct wave $h$TOF=direct wave TOF/2, $d(\text{direct wave } h\text{TOF})=\text{direct wave } h\text{TOF}_{t=n} - \text{direct wave } h\text{TOF}_{t=n-1}[m]$, V: vehicle speed, and
dt: ultrasonic update cycle [ms].

The static noise determination unit may be configured to determine that the static noise is generated when $$|\text{direct wave } h\text{TOF} - \text{indirect wave } h\text{TOF}| > \text{distance between sensors}/2$$

where $h$TOF=TOF/2 and distance between sensors: distance between a sensor emitting and receiving a direct wave and a sensor receiving an indirect wave.

The virtual object generation unit may be configured to generate the virtual object at an intersection at which a circle having the center at a position of the sensor emitting and receiving the direct wave and the radius of the direct wave hTOF crosses the outline of the parking path.

The virtual indirect wave generation unit may be configured to calculate the virtual indirect wave TOF as the sum of a straight line connecting a position of the sensor emitting and receiving the direct wave to the virtual object and a straight line connecting the virtual object to a position of the sensor receiving the indirect wave.

When the sensor emitting and receiving the direct wave is located on an outer side of the parking path, compared with the sensor receiving the indirect wave, the object location determination unit may be configured to determine that the object is located outside the outline of the parking path if the real indirect wave TOF is greater than the virtual indirect wave TOF and that the object is located inside the outline of the parking path if the real indirect wave TOF is equal to or less than the virtual indirect wave TOF.

The present invention allows the determination of whether the obstacles located on or around the parking path that the vehicle is to move on for parking are inside or outside the parking path using ultrasonic sensors mounted in the vehicle, thereby allowing execution of smoother and safer parking.

BRIEF DESCRIPTION OF THE DRAWINGS

FIG. 14 is a graph illustrating changes of P_m according to changes of a.

FIG. 15 is a graph illustrating changes of P_n according to changes of a.

FIG. 19 is a table showing minimum values and maximum values, and P_max of the difference between a real indirect wave hTOF and an ideal indirect wave hTOF as a increases.

DETAILED DESCRIPTION OF THE INVENTION

Figure 1:
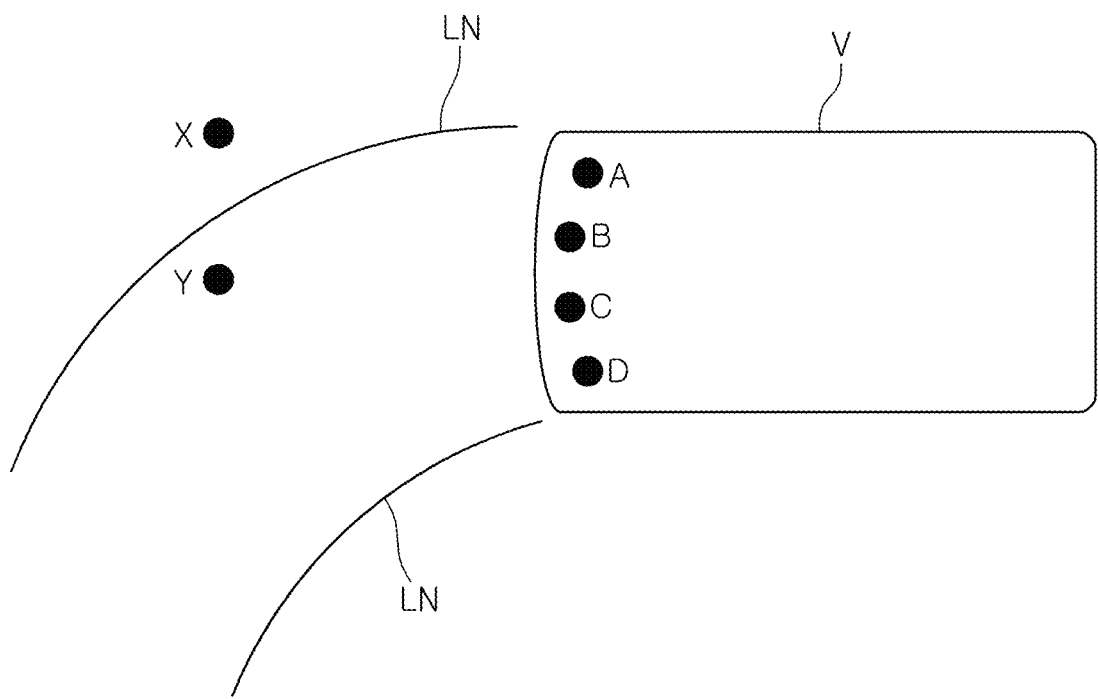
FIG. 1 is a view illustrating a sensor mounting state of a vehicle to which the present invention may be applied.

Specific structural or functional descriptions of the embodiments of the present invention disclosed in the present specification or application existed by way of examples only for the purpose of describing the embodiments according to the present invention, and the embodiments according to the present invention may be implemented in various forms and are not to be construed as being limited to the embodiments described in the present specification or application.

Since the embodiment of the present invention may be modified in various ways and have various forms, specific embodiments will be illustrated in the drawings and described in the present specification or application. However, this is not intended to limit the embodiments according to the concept of the present invention to the specific forms and is to be construed as including all modifications, equivalents, and substitutes included in the spirit and technical scope of the present invention.

Terms such as first and/or second may be used to describe various components, but the components are not to be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it is to be understood that other components may exist in between. On the other hand, when a component is referred to as being "directly connected" or "directly coupled" to another component, it is to be understood that there are no intervening components present. Other expressions describing the relationship between components such as "between" and "just between", or "adjacent to" and "directly adjacent to" are to be interpreted in the same manner.

The terms used herein are used for the purpose of describing particular embodiments only and are not intended to limit the invention. Singular expressions include plural expressions unless the context explicitly indicates otherwise. In the present specification, terms such as "comprise" or "have" are intended to designate the presence of implemented features, numbers, steps, operations, components, parts, or combinations thereof and are not to be understood to preclude the presence or additional possibilities of one or more of other features, numbers, steps, operations, components, parts or combinations thereof in advance.

Unless otherwise defined, all terms used herein, including technical or scientific terms, have the same meanings as are generally understood by those with common knowledge in the art to which the present invention pertains. It will be further understood that terms, such as those defined in commonly used dictionaries, is to be interpreted as having a meaning that is consistent with their meaning in the context of the present specification, and will not be interpreted in an idealized or overly formal sense unless expressly so defined herein.

In the following, the present invention will be described in detail by describing preferred embodiments of the present invention with reference to the accompanying drawings. The same reference numerals shown in each drawing indicate the same members.

Information on an object may be obtained from the time of flight (TOF) of an ultrasonic signal emitted from an ultrasonic sensor (simply referred to as a 'sensor' hereinafter), reflected by the object, and then, received by the sensor.

That is, the distance from the sensor to the object may be calculated from the TOF, which is the time interval from the point in time when an ultrasonic wave is emitted from the sensor to the point in time when the ultrasonic wave is reflected by the object and is received by the sensor, and the location of the object with respect to a vehicle may be calculated when a plurality of sensors mounted in the vehicle are employed.

The ultrasonic wave reflected by an object as described above may be received by the sensor that emitted the ultrasonic wave or may be received by other adjacent sensors.

Here, when the sensor emitting the ultrasonic wave and the sensor receiving the ultrasonic wave are the same as described above, the TOF of the ultrasonic wave received by the sensor will be referred to as 'direct wave TOF', and when the sensor emitting the ultrasonic wave and the sensor receiving the ultrasonic wave are different, the TOF of the ultrasonic wave received by the sensor will be referred to as 'indirect wave TOF'.

Information on the objects around the vehicle may be obtained by repeated measurement of the ultrasonic wave TOF by the vehicle sensors described above. When the ultrasonic waves are not reflected by the same object and the ultrasonic wave TOFs are not updated continually, the accuracy of the information on the location of the object possibly decreases, which suggests the generation of noise in the ultrasonic sensor signal.

It is to be noted that the distance from a sensor to an object is calculated from ultrasonic wave TOF/2$C$, where $C$=ultrasonic speed.

In the following, for the sake of simplifying expressions, a simple notation of 'ultrasonic wave TOF' refers to 'ultrasonic wave TOF/$C$', meaning the reciprocating distance from a sensor to an object, and 'ultrasonic wave TOF/2' is denoted by 'hTOF'. That is, hTOF means the one-way distance between the sensor and the object.

FIG. 1 is a view illustrating a sensor mounting state of a vehicle to which the present invention may be applied. Four sensors A, B, C, and D are disposed at the rear of the vehicle V, a parking path that the vehicle is to drive on is denoted by two outlines LN indicating the outer edges of the parking path, and an object X located outside the parking path and an object Y located inside the parking path are illustrated.

It is to be noted that the parking path may change according to the speed, steering angle, and the like of the vehicle and may be set by devices mounted in the vehicle and configured to use an already known technology, and the sensors may be configured to sequentially emit ultrasonic waves at predetermined intervals and receive the ultrasonic waves reflected by the object, thereby allowing distinction among the sensors that emitted the ultrasonic waves.

Figure 2A:
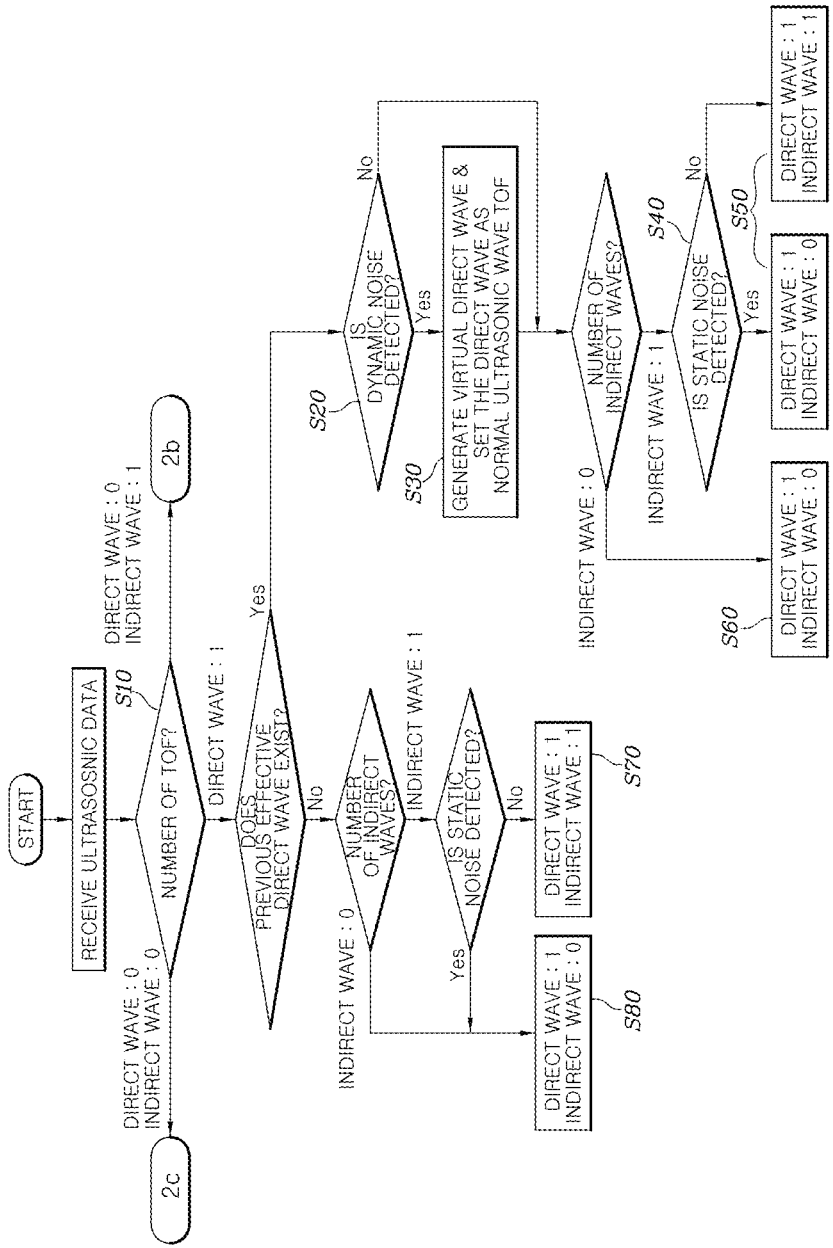
FIGS. 2A-2C are a flowchart illustrating a noise filtering method of a vehicle ultrasonic sensor signal according to the present invention.
Figure 2B:
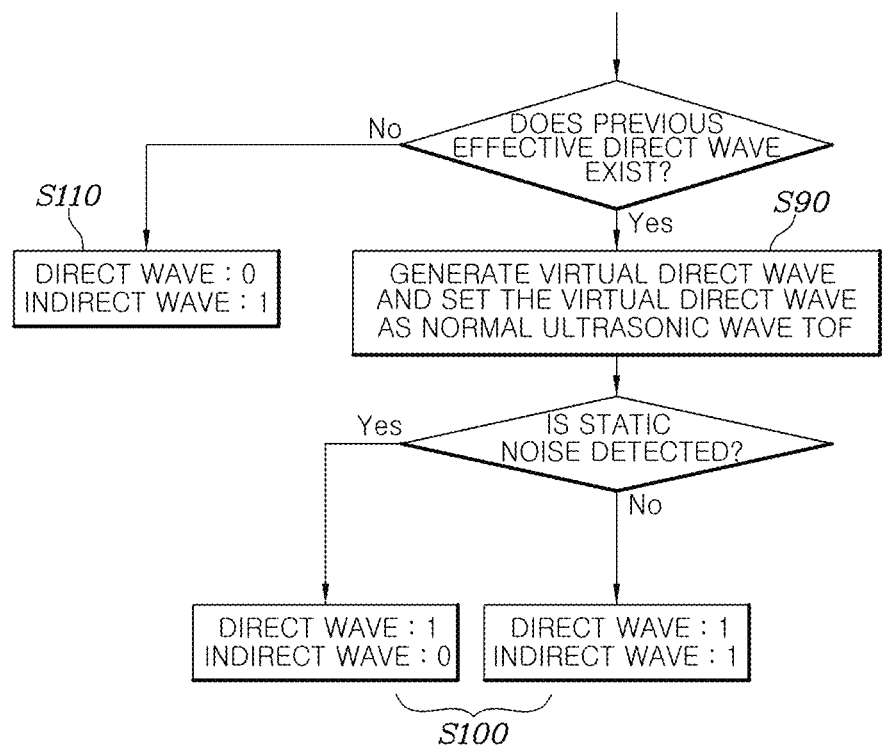
Figure 2C:
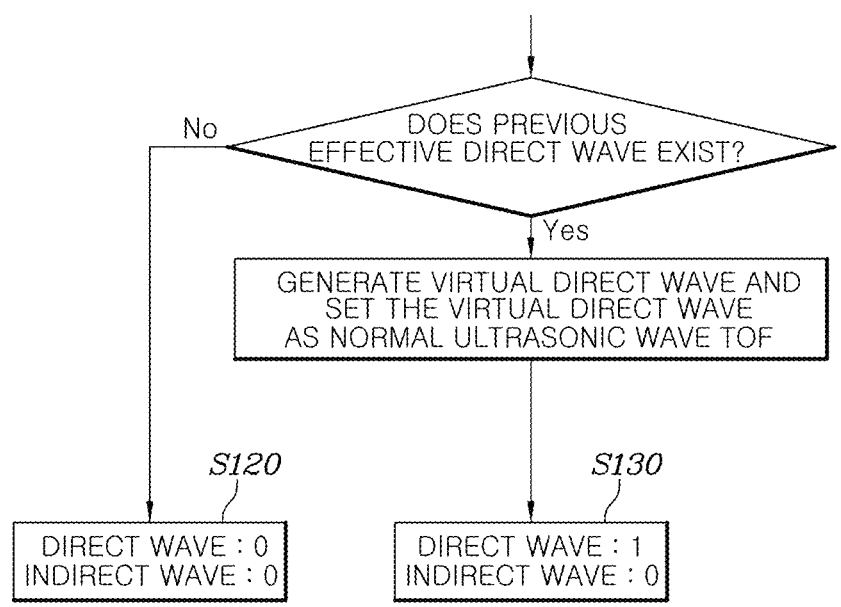

Assuming that, of the two sensors adjacent to each other, one receives the direct wave and the other receives the indirect wave, as shown in FIGS. 2A-2C, a noise filtering method of a vehicle ultrasonic sensor signal is configured to include determining the number of direct wave TOF and indirect wave TOF among the TOFs of the ultrasonic waves received by the two vehicle sensors adjacent to each other (S10); when the received ultrasonic wave TOFs include one direct wave TOF, determining whether a dynamic noise is detected if a previous effective direct wave TOF exists (S20); generating a virtual direct wave TOF when the dynamic noise is detected and setting the virtual direct wave TOF object, instead of the received real direct wave TOF, as a normal ultrasonic wave TOF to be used in determining the location of an object (S30); determining whether a static noise is detected when a direct wave TOF exists among the received ultrasonic wave TOFs, a previous effective direct wave TOF exists, and an indirect wave TOF exists in the received ultrasonic wave TOFs (S40); and determining a normal ultrasonic wave TOF, which is to be used in determining the location of the object, to be one direct wave TOF and zero indirect wave TOF when the static noise is detected and determining the normal ultrasonic wave TOF, which is to be used in determining the location of the object, to be one direct wave TOF and one indirect wave TOF when no static noise is detected (S50).

That is, the method of filtering a noise of a sensor signal is differently configured according to the number of direct wave TOF and indirect wave TOF, and when a direct wave TOF exists, the normal ultrasonic wave TOF which is to be used in determining the location of the object is differently determined depending on whether a dynamic noise and a static noise are detected as described above.

It is to be noted that when a virtual direct wave TOF is generated as described above, the generated virtual direct wave TOF is set as a normal ultrasonic wave TOF which is to be used in subsequently determining the location of the object as described above, and when a virtual direct wave TOF is not generated, the received real direct wave TOF serves as the normal ultrasonic wave TOF.

It is determined that the dynamic noise is generated when $d$(direct wave $h$TOF)>$Vdt$, where direct wave $h$TOF=direct wave TOF/2, $dh\text{TOF}=h\text{TOF}_{t=n}-h\text{TOF}_{t=n-1}$[m], V: vehicle speed, and dt: ultrasonic update cycle [ms].

Figure 3:
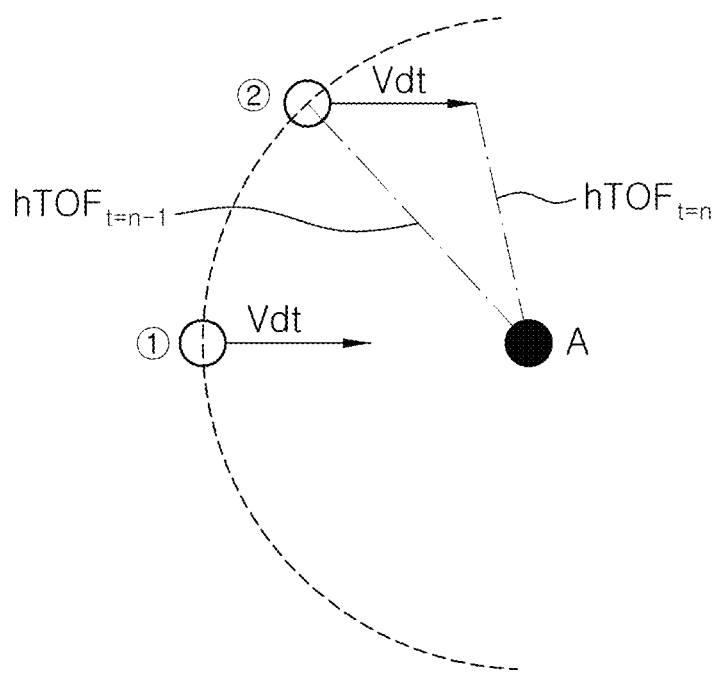
FIG. 3 is a view describing a relationship between vehicle speed and direct wave TOF.

FIG. 3 is a view showing a relationship between the vehicle speed and direct wave TOF from a viewpoint of any sensor such as sensor A among the sensors shown in FIG. 1. It is to be expected that, when the vehicle moves by Vdt, the maximum value of the change in the direct wave hTOF reflected by the same object is equal to or less than Vdt so that, when it is determined that d (direct wave hTOF) is greater than Vdt, the direct wave TOF cannot be regarded to be continuously reflected by the same object and updated, and it is determined that a dynamic noise is generated.

It is determined that the static noise is generated when

|direct wave $h$TOF−indirect wave $h$TOF|>distance between sensor/2 where $h$TOF=TOF/2 and distance between sensors: distance between the sensor emitting and receiving the direct wave and the sensor receiving the indirect wave.

Figure 4:
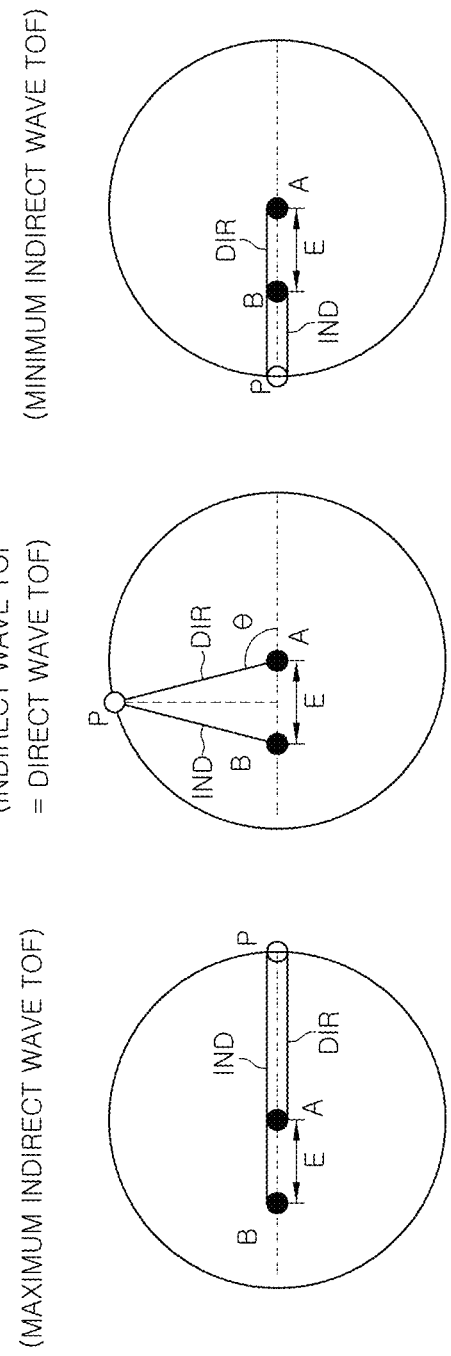
FIG. 4 is a view showing changes of indirect wave TOF according to locations of an arbitrary object P in three cases.

FIG. 4 is a view illustrating changes of the indirect wave TOF according to the position of any object P. A case where the indirect wave TOF reaches the maximum value, a case where the indirect wave TOF=direct wave TOF, and a case where the indirect wave TOF reaches the minimum value are juxtaposed for comparison.

In FIG. 4, sensor A is a sensor emitting and receiving a direct wave, sensor B is a sensor receiving an indirect wave, DIR denotes the distance between the sensor A and the object P, IND denotes the distance between the object P and the sensor B, E denotes the distance between the sensors A and B, and 6 denotes the angle formed by a straight line connecting the sensors A and B to the straight line denoted by DIR.

Figure 5:
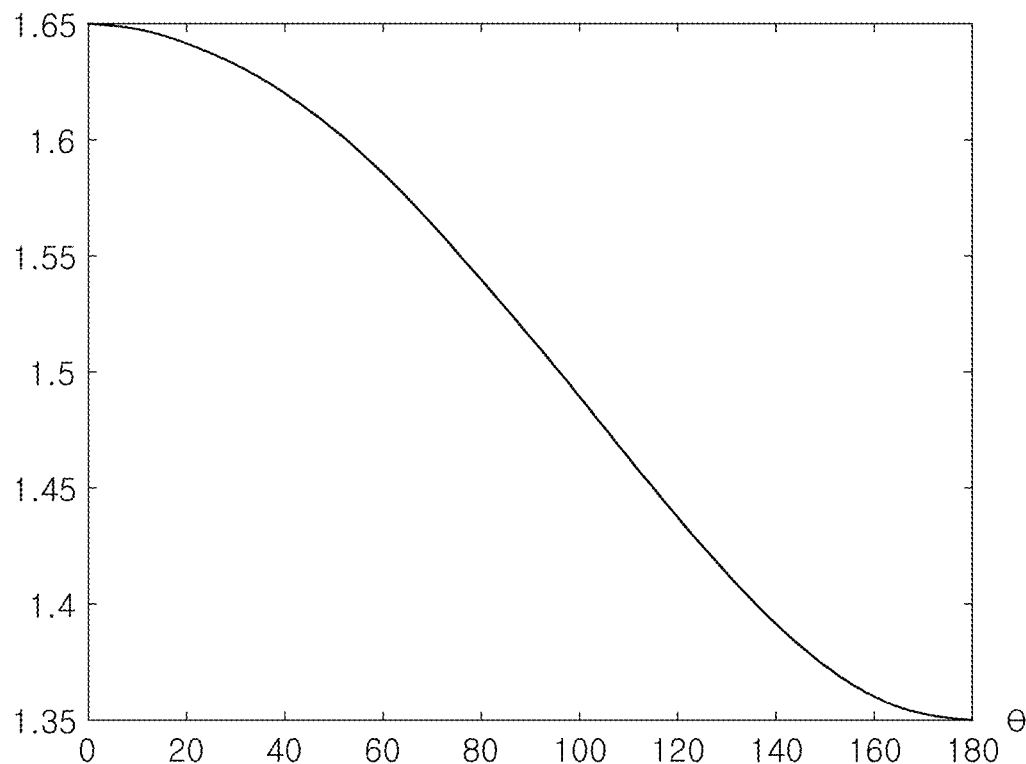
FIG. 5 is a graph of indirect wave hTOF according to changes of θ.

Here, the direct wave hTOF is DIR and the indirect wave hTOF may be calculated by (DIR+IND)/2. The states of the maximum value and the minimum value in FIG. 4 show that the maximum value of the indirect wave hTOF is calculated by (DIR+DIR+E)/2=DIR+E/2, that the minimum value of the indirect wave hTOF is calculated by (DIR+DIR−E)/2=DIR−E/2, and that the indirect wave hTOF tends to gradually decrease from the maximum value to the minimum value as 6 increases as shown in FIG. 5.

That is, the indirect wave hTOF changes in the range of DIR+E/2 to DIR−E/2, where DIR is the direct wave hTOF, according to the 6, so that the difference between the direct wave hTOF and the indirect wave hTOF is within E/2 for all 6. When the difference between the direct wave hTOF and the indirect wave hTOF exceeds E/2, the indirect wave TOF cannot be regarded to be continuously reflected by the same object and updated and it is determined that the static noise is generated.

In addition, it is determined that the previous effective direct wave TOF exists when the direct wave TOF is received four times in a row and $d[(\text{direct wave } h\text{TOF})_{t=n-1} \leq \Box V_{t=n-1} \, dt]$ and $[(\text{direct wave } h\text{TOF})_{t=n-2} \leq \Box v_{t=n-2} \, dt]$ where direct wave $h$TOF=direct wave TOF/2, $d(\text{direct wave } h\text{TOF})_{t=n-1}=\text{direct wave } h\text{TOF}_{t=n-1}-\text{direct wave } h\text{TOF}_{t=n-2}$, $d(\text{direct wave } h\text{TOF})_{t=n-2}=\text{direct wave } h\text{TOF}_{t=n-2}-\text{direct wave } h\text{TOF}_{t=n-3}$, V: vehicle speed, and dt: ultrasonic update cycle [ms].

It is to be noted that may be interpreted as a cycle time of a controller implementing the present invention, such that t=n may be interpreted as the current cycle time, t=n−1 may be interpreted as a previous cycle time.

That is, when it is checked the direct wave TOF is received four times in a row and that no dynamic noise is generated in the previous three direct wave hTOFs, it is determined that the previous effective direct wave TOF exists.

Accordingly, even if it is determined that a dynamic noise is generated at t=n, it is determined that the previous effective direct wave TOF exists as described above when no dynamic noise was generated at t=n−1 and t=n−2 so that the virtual direct wave TOF is generated. This virtual direct wave TOF is set as a normal ultrasonic wave TOF which is to be used in determining the location of the object.

At t=n, which is the present time, the virtual direct wave TOF is calculated by direct wave $\text{TOF}_{t=n-1}+k(\text{direct wave TOF}_{t=n-1}-\text{direct wave TOF}_{t=n-2})$ where k: gain.

k may be set to 1, for example, and the value may be varied depending on how much the change in the direct wave TOF is reflected in the virtual direct wave TOF.

On the other hand, it is determined that no previous effective direct wave TOF exists when the virtual direct wave TOF, instead of the received direct wave TOF, was set as the normal ultrasonic wave TOF in determining the location of the object at least at one point of t=n−1, t=n−2, and t=n−3.

In the noise filtering method of the ultrasonic sensor signal, when a direct wave TOF exists, a previous effective direct wave TOF exists, and no indirect wave TOF exists among the received ultrasonic wave TOFs, the determining of the normal ultrasonic wave TOF, which is to be used in determining the location of the object, to be one direct wave TOF and zero indirect wave TOF may be performed (S60).

In addition, when a direct wave TOF exists, no previous effective direct wave TOF exists, an indirect wave TOF exists, and no static noise is detected among the received ultrasonic wave TOFs, the determining of the normal ultrasonic wave TOF, which is to be used in determining the location of the object, to be one direct wave TOF and one indirect wave TOF may be performed (S70).

Either when a direct wave TOF exists, no previous effective direct wave TOF exists, an indirect wave TOF exists, and a static noise is detected or when a direct wave TOF exists, no previous effective direct wave TOF exist, and no indirect wave TOF exist among the received ultrasonic wave TOFs, the determining of the normal ultrasonic wave TOF, which is to be used in determining the location of the object, to be one direct wave TOF and zero indirect wave TOF may be performed (S80).

That is, when it is determined that one direct wave is received in the determining of the number of the direct wave TOF and the indirect wave TOF (S10), filtering is performed through S20 to S80 such that the received direct wave TOF is replaced with a virtual direct wave TOF or is set as the normal ultrasonic wave TOF which is to be used in determining the location of the object as is according to the presence or absence of a dynamic noise and the received indirect wave TOF is either used or not used in determining the location of the object according to the presence or absence of a static noise.

On the other hand, the noise filtering method of the ultrasonic sensor signal further includes generating a virtual direct wave TOF and setting the virtual direct wave TOF as the normal ultrasonic wave TOF which is to be used in determining the location of the object when no direct wave TOF exists, an indirect wave TOF exists, and a previous effective direct wave TOF exists among the received ultrasonic wave TOFs (S90). After setting the virtual direct wave TOF as the normal ultrasonic wave TOF, which is to be used in determining the location of the object, when no direct wave TOF exists, an indirect wave TOF exists, and a previous effective direct wave TOF exists among the received ultrasonic wave TOFs, whether a static noise is detected is determined. The noise filtering method may further include setting the normal ultrasonic wave TOF, which is to be used in determining the location of the object, to be one direct wave TOF and one indirect wave TOF if no static noise is detected and setting the normal ultrasonic wave TOF, which is to be used in determining the location of the object, to be one direct wave TOF and zero indirect wave TOF if a static noise is detected (S100).

Here, when no direct wave TOF exists, an indirect wave TOF exists, and no previous effective direct wave TOF exists among the received ultrasonic wave TOFs, a virtual direct wave TOF as described above may not be generated as described above so that the normal ultrasonic wave TOF, which is to be used in determining the location of the object, is set to be zero direct wave TOF and one indirect wave TOF(S110).

In addition, the noise filtering method of the ultrasonic sensor signal may further include setting the normal ultrasonic wave TOF, which is to be used in determining the location of the object, to be zero direct wave TOF and zero indirect wave TOF when neither direct wave TOF nor indirect wave TOF exists and no previous effective direct wave TOF exists among the received ultrasonic wave TOFs (S120) and generating a virtual direct wave TOF when neither direct wave TOF nor indirect wave TOF exists and a previous effective direct wave TOF exists among the received ultrasonic wave TOFs, setting the virtual direct wave TOF as the normal ultrasonic wave TOF, which is to be used in determining the location of the object, and setting the normal ultrasonic wave TOF, which is to be used in determining the location of the object, to be one direct wave TOF and zero indirect wave TOF (S130).

In the noise filtering method of the vehicle ultrasonic sensor signal as described above, only reliable ultrasonic wave TOF is set as the normal ultrasonic wave TOF and less reliable ultrasonic wave TOF is excluded from the received ultrasonic wave TOFs, depending on the presence or absence of a dynamic noise and a static noise in the received ultrasonic wave TOF, so that the location of the object is more accurately determined when the sensors receive the ultrasonic waves reflected by the object and detect the object.

Figure 28:
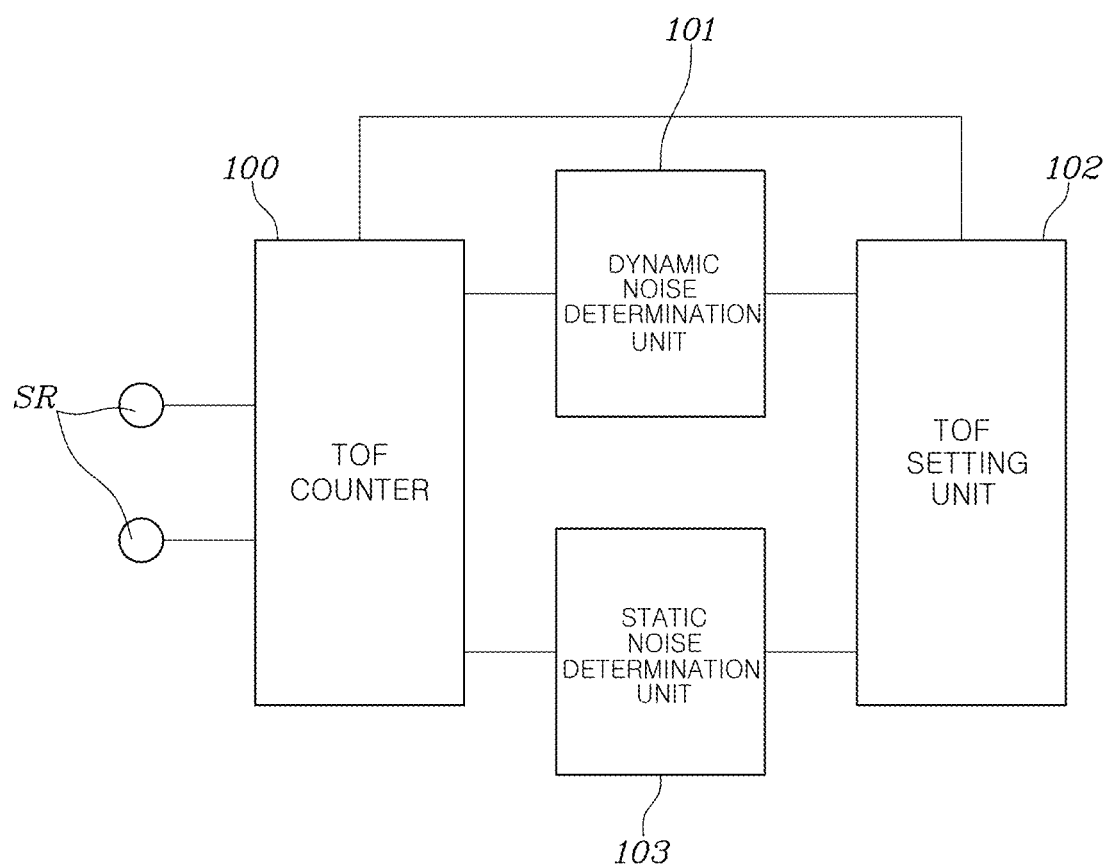
FIG. 28 is a view showing an embodiment of a noise filtering apparatus of a vehicle ultrasonic sensor signal, the apparatus being configured to implement the noise filtering method of the vehicle ultrasonic sensor signal as shown in FIGS. 2A-2C.

FIG. 28 shows that a noise filtering apparatus of a vehicle ultrasonic sensor signal, the apparatus being configured to implement the noise filtering method of a vehicle ultrasonic sensor signal as described above, may be configured to include a TOF counter 100 determining the number of direct wave TOF and indirect wave TOF among the TOFs of the ultrasonic waves received by two vehicle sensors SR adjacent to each other; a dynamic noise determination unit 101 determining whether a dynamic noise is detected when the TOF counter 100 determines that one direct wave TOF is included in the received ultrasonic wave TOFs and a previous effective direct wave TOF exists; a TOF setting unit 102 generating a virtual direct wave TOF when the dynamic noise determination unit 101 detects a dynamic noise and setting the virtual direct wave TOF, instead of the received direct wave TOF, as a normal ultrasonic wave TOF which is to be used in determining the location of the object; and a static noise determination unit 103 determining whether a static noise is detected when a direct wave TOF exists, a previous effective direct wave TOF exists, and an indirect wave TOF exists among the received ultrasonic wave TOFs.

In addition, the TOF setting unit 102 may be configured to determine the normal ultrasonic wave TOF, which is to be used in determining the location of the object, to be one direct wave TOF and zero indirect wave TOF when the static noise determination unit 103 detects a static noise and determine the normal ultrasonic wave TOF, which is to be used in determining the location of the object, to be one direct wave TOF and one indirect wave TOF when no static noise is detected.

The TOF setting unit 102 may be configured to determine the normal ultrasonic wave TOF, which is to be used in determining the location of the object, to be one direct wave TOF and zero indirect wave TOF when a direct wave TOF exists, a previous effective direct wave TOF exists, and no indirect wave TOF exists among the received ultrasonic wave TOFs.

The TOF setting unit 102 may be configured to determine the normal ultrasonic wave TOF, which is to be used in determining the location of the object, to be one direct wave TOF and one indirect wave TOF when a direct wave TOF exists, no previous effective direct wave TOF exists, an indirect wave TOF exists while, and no static noise is detected among the received ultrasonic wave TOFs.

The TOF setting unit 102 may be configured to determine the normal ultrasonic wave TOF, which is to be used in determining the location of the object, to be one direct wave TOF and zero indirect wave TOF either when a direct wave TOF exists, no previous effective direct wave TOF exists, an indirect wave TOF exists, and a static noise is detected or when a direct wave TOF exists and no indirect wave TOF exists while no previous effective direct wave TOF exits among the received ultrasonic wave TOFs.

In addition, the TOF setting unit 102 may be configured to generate a virtual direct wave TOF when no direct wave TOF exists, an indirect wave TOF exists, and a previous effective direct wave TOF exists among the received ultrasonic wave TOFs and setting the virtual direct wave TOF as the normal ultrasonic wave TOF which is to be used in determining the location of the object.

After the TOF setting unit 102 sets the virtual direct wave TOF as the normal ultrasonic wave TOF, which is to be used in determining the location of the object, when no direct wave TOF exists, an indirect wave TOF exists, and a previous effective direct wave TOF exists among the received ultrasonic wave TOFs, the static noise determination 103 determines whether static noise is detected is determined. The TOF setting unit 102 may be configured to set the normal ultrasonic wave TOF, which is to be used in determining the location of the object, to be one direct wave TOF and one indirect wave TOF if no static noise is detected and set the normal ultrasonic wave TOF, which is to be used in determining the location of the object, to be one direct wave TOF and zero indirect wave TOF if a static noise is detected.

The TOF setting unit 102 may be configured to set the normal ultrasonic wave TOF, which is to be used in determining the location of the object, to be zero direct wave TOF and zero indirect wave TOF when neither the direct wave TOF nor the indirect wave TOF exists and no previous effective direct wave TOF exists among the received ultrasonic wave TOFs and may generate a virtual direct wave TOF when neither the direct wave TOF nor the indirect wave TOF exists and a previous effective direct wave TOF exists among the received ultrasonic wave TOFs, set the virtual indirect wave TOF as the normal ultrasonic wave TOF, which is to be used in determining the location of the object, and set the normal ultrasonic wave TOF, which is to be used in determining the location of the object, to be one direct wave TOF and zero indirect wave TOF.

The dynamic noise determination unit 101 may be configured to determine that the dynamic noise is generated when $$d(\text{direct wave } h\text{TOF}) > Vdt,$$

where direct wave $h$TOF=direct wave TOF/2, $$d(\text{direct wave } h\text{TOF}) = \text{direct wave } h\text{TOF}_{t=n} - \text{direct wave } h\text{TOF}_{t=n-1}[m],$$

V: vehicle speed, and dt: ultrasonic update cycle [ms].

The static noise determination unit 103 may be configured to determine that the static noise is generated when $$|\text{direct wave } h\text{TOF} - \text{indirect wave } h\text{TOF}| > \text{distance between sensors}/2,$$

where $h$TOF=TOF/2 and distance between sensors: distance between a sensor emitting and receiving direct wave and a sensor receiving indirect wave.

The dynamic noise determination unit 101 and the static noise determination unit 103 are respectively configured to determine whether a previous effective direct wave TOF exists and it is determined that the previous effective direct wave TOF exists when the direct wave TOF is received four times in a row and $$[d(\text{direct wave } h\text{TOF})_{t=n-1} \le V_{t=n-1} \, dt] \text{ and } [d(\text{direct wave } h\text{TOF})_{t=n-2} \le V_{t=n-2} \, dt]$$

where direct wave $h$TOF=direct wave TOF/2, $$d(\text{direct wave } h\text{TOF})_{t=n-1} = \text{direct wave } h\text{TOF}_{t=n-1} - \text{direct wave } h\text{TOF}_{t=n-1},$$

$d(\text{direct wave } h\text{TOF})_{t=n-2}=\text{direct wave } h\text{TOF}_{t=n-2}-\text{direct wave } h\text{TOF}_{t=n-3}$, V: vehicle speed, and dt: ultrasonic update cycle [ms].

It is determined that no previous effective direct wave TOF exists when a virtual direct wave TOF, instead of the received direct wave TOF, was set as the normal ultrasonic wave TOF, which is to be used in determining the location of the object, at least at one point of t=n−1, t=n−2, and t=n−3.

At t=n, which is the present time, the virtual direct wave TOF is calculated by direct wave TOF$_{t=n-1}$+k(direct wave TOF)$_{t=n-1}$−direct wave TOF$_{t=n-2}$)

where k: gain.

Figure 6:
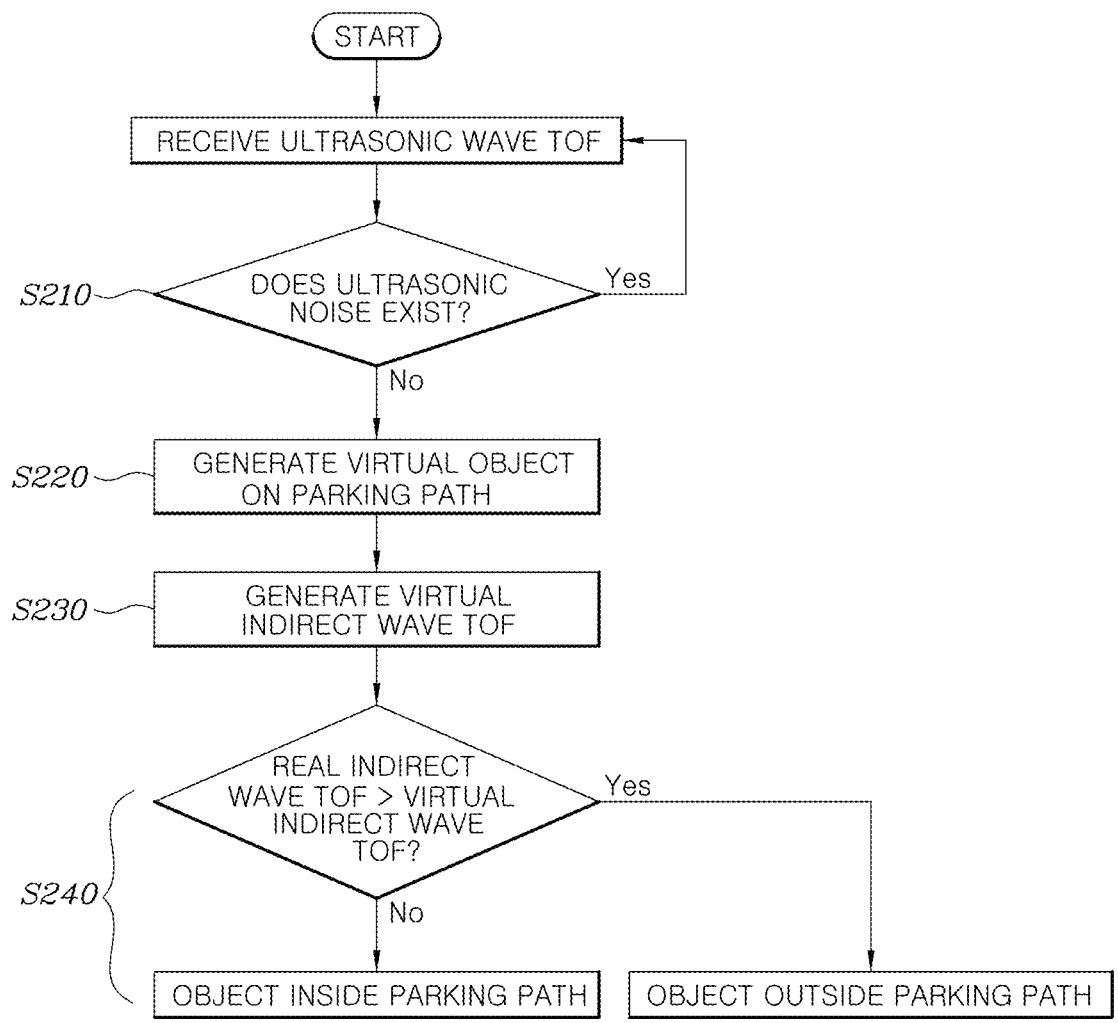
FIG. 6 is a flowchart showing a first embodiment of the determining method for obstacles on and around a parking path using ultrasonic waves.

FIG. 6 shows that a first embodiment of the determining method for obstacles on and around the parking path using ultrasonic waves includes determining whether an ultrasonic noise exists in the TOFs of the ultrasonic waves reflected by an object and received (S210); generating a virtual object on an outline of a parking path that the vehicle is to move on based on the received ultrasonic wave TOF when no ultrasonic noise exist (S220); generating a virtual indirect wave TOF using the virtual object (S230); and determining whether the object is located inside or outside the outline of the parking path by comparing the real indirect wave TOF, which is indirect wave TOF among the received ultrasonic wave TOFs, with the virtual indirect wave TOF (S240).

In the determining of whether an ultrasonic noise exists (S210), it is determined that no ultrasonic noise exits when both TOF and indirect wave TOF exist and neither the dynamic noise nor the static noise exists in the received ultrasonic wave TOF.

That is, when it is checked that both the direct wave TOF and indirect wave TOF exist and neither the dynamic noise nor the static noise exists so that the direct wave TOF and indirect wave TOF are continuously reflected by the same object and updated, the received direct wave TOF and received indirect wave TOF are determined as the normal ultrasonic wave TOF, which is to be used in determining the location of the object, such that it is determined that no ultrasonic noise exists.

Figure 7:
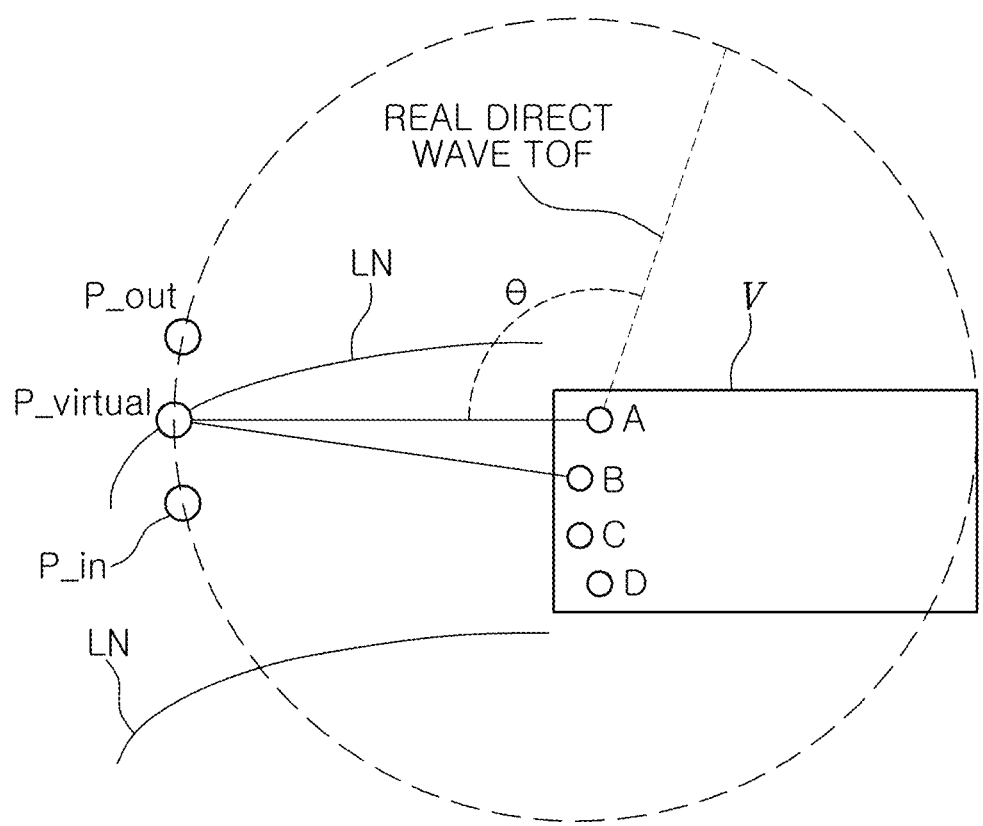
FIG. 7 is a view describing virtual indirect wave TOF.

As illustrated in FIG. 7, the virtual object is generated at an intersection P_virtual at which a circle having the center at a position of a sensor emitting and receiving the direct wave and the radius of the direct wave hTOF crosses the outline of the parking path.

The virtual indirect wave TOF is calculated as the sum of a straight line connecting the position of the sensor emitting and receiving the direct wave to the virtual object and a straight line connecting the virtual object to the position of a sensor receiving the indirect wave.

That is, in the case of FIG. 7, the virtual indirect wave TOF is calculated as the sum of the distance between P_virtual and sensor A and the distance between P_virtual and sensor B.

It is to be noted that the real direct wave TOF means the TOF of the direct wave received by the sensor in FIG. 7.

In the determining of whether the object is located inside or outside the outline of the parking path (S240), when the sensor emitting and receiving the direct wave is located on an outer side of the parking path, compared with the sensor receiving the indirect wave, it is determined that the object is located outside the outline of the parking path if the real indirect wave TOF is greater than the virtual indirect wave TOF and that the object is located inside the outline of the parking path if the real indirect wave TOF is equal to or less than the virtual indirect wave TOF.

Examining FIG. 7 will help understand its validity.

That is, FIG. 7 shows that the indirect wave TOF is to be greater than the virtual indirect wave TOF when the ultrasonic wave emitted by the sensor A is reflected at P_out located outside the outline of the parking path and is received by the sensor B and that the indirect wave TOF is to be less than the virtual indirect wave TOF when the ultrasonic wave emitted by the sensor A is reflected at P_in located inside the outline of the parking path and is received by the sensor B.

Accordingly, whether the object reflecting the ultrasonic wave TOF is located inside the parking path or not may be determined according to whether the real indirect wave TOF measured by the sensor is greater or less than the virtual TOF calculated as described above.

It is to be noted that the 'real indirect wave TOF' is an expression for clear distinction from the 'virtual indirect wave TOF' and actually means the TOF of the indirect wave received and calculated by the sensor.

Of course, since a plurality of sensors are mounted in the vehicle as illustrated in FIG. 7, the plurality of sensors mounted in the vehicle sequentially emit ultrasonic waves and the steps as described above are repeatedly performed by two adjacent sensors each time the respective sensors emit the ultrasonic waves so that whether the obstacle on and around the parking path is located inside the parking path may be determined more accurately.

Figure 29:
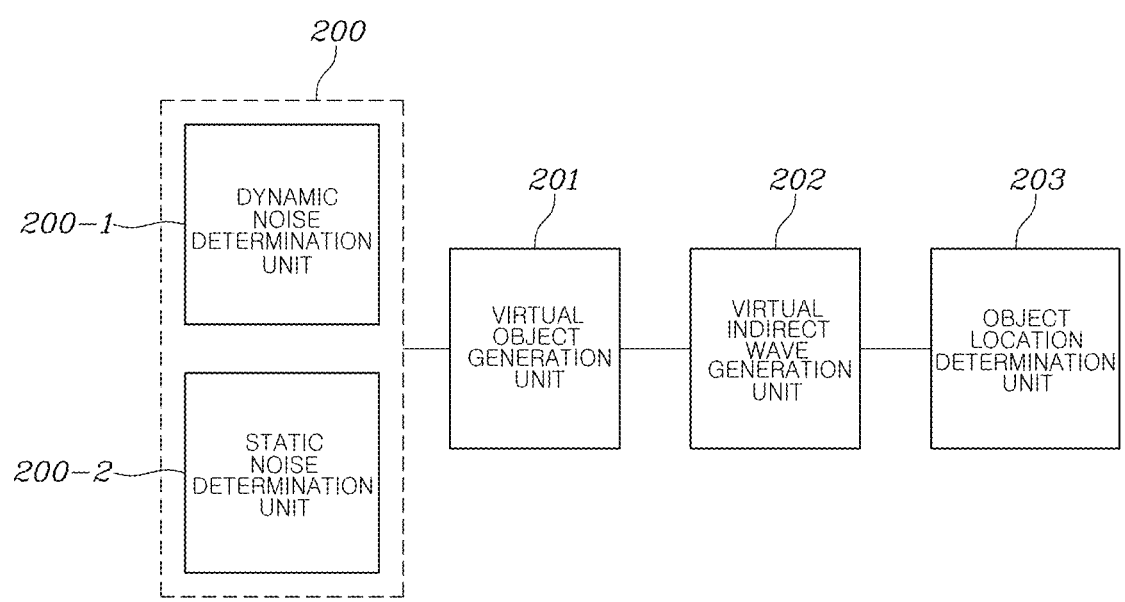
FIG. 29 shows a determining apparatus for obstacles on and around a parking path using ultrasonic waves.

FIG. 29 shows that determining apparatus for obstacles on and around a parking path using ultrasonic waves, the apparatus being configured to implement the first embodiment of the determining method for obstacles on and around the parking path using the ultrasonic wave, may be configured to include a noise determination unit 200 determining whether an ultrasonic noise exists in the TOFs of the ultrasonic waves reflected by an object and received; a virtual object generation unit 201 generating a virtual object on an outline of the parking path that the vehicle is to move on based on the received ultrasonic wave TOF when the noise determination unit 200 determines that no ultrasonic noise exists; a virtual indirect wave generation unit 202 generating a virtual indirect wave TOF using the virtual object generated by the virtual object generation unit 201; and an object location determination unit 203 determining whether the object is located inside or outside the outline of the parking path by comparing the real indirect wave TOF, which is the indirect wave TOF among the received ultrasonic wave TOFs, with the indirect wave TOF generated by the virtual indirect wave generation unit 202.

The noise determination unit 200 may be configured to include a dynamic noise determination unit 200-1 and a static noise determination unit 200-2 and determine that no ultrasonic noise exists when both the direct wave TOF and the indirect wave TOF exist and neither the dynamic noise nor the static noise exists in the received ultrasonic wave TOFs.

The dynamic noise determination unit 200-1 may be configured to determine that the dynamic noise is generated when $d(\text{direct wave } h\text{TOF})>Vdt$, where direct wave $h$TOF=direct wave TOF/2, $d(\text{direct wave } h\text{TOF})=\text{direct wave } h\text{TOF}_{t=n}-\text{direct wave } h\text{TOF}_{t=n-1}$[m], V: vehicle speed, and dt: ultrasonic update cycle [ms].

The static noise determination unit 200-2 may be configured to determine that the static noise is generated when

|direct wave hTOF−indirect wave hTOF|>distance between sensors/2, where hTOF=TOF/2 and distance between sensors: distance between the sensor emitting and receiving the direct wave and the sensor receiving the indirect wave.

The virtual object generation unit 201 may be configured to generate the virtual object at the intersection at which a circle having the center at the position of the sensor emitting and receiving the direct wave and the radius of direct wave hTOF crosses the outline of the parking path.

The virtual indirect wave generation unit 202 may be configured to generate the virtual indirect wave TOF as the sum of a straight line connecting the position of the sensor emitting and receiving the direct wave to the virtual object and a straight line connecting the virtual object to the position of the sensor receiving the indirect wave.

When the sensor emitting and receiving the direct wave is located on the outer side of the parking path, compared with the sensor receiving the indirect wave, the object location determination unit 203 may be configured to determine that the object is located outside the outline of the parking path if the real indirect wave TOF is greater than the virtual indirect wave TOF and that the object is located inside the outline of the parking path if the real indirect wave TOF is equal to or less than the virtual indirect wave TOF.

Figure 8:
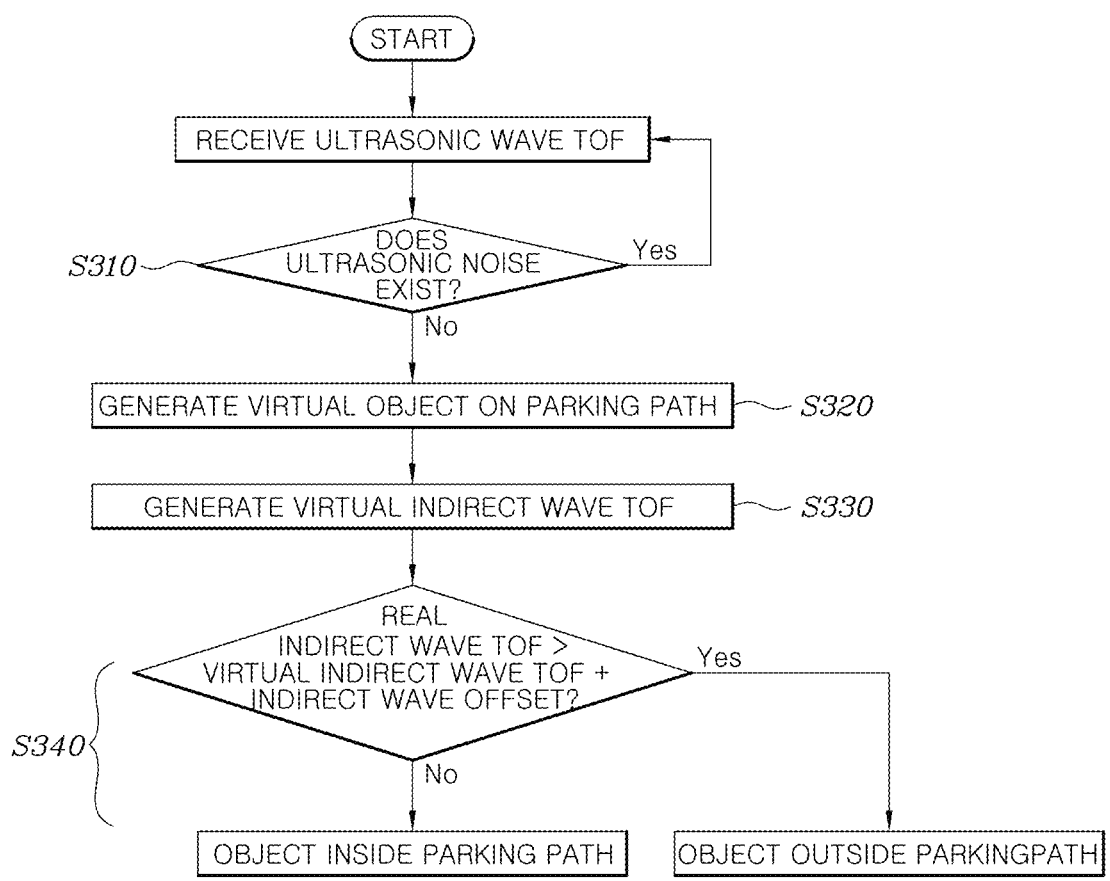
FIG. 8 is a flowchart showing a second embodiment of the determining method for obstacles on and around a parking path using ultrasonic waves.

FIG. 8 shows that a second embodiment of the determining method for obstacles on and around the parking path using ultrasonic waves includes determining whether an ultrasonic noise exists in the TOFs of the ultrasonic waves reflected by an object and received (S310); generating a virtual object on the outline of the parking path that the vehicle is to move on based on the received ultrasonic wave TOF when no ultrasonic noise exists (S320); generating virtual indirect wave TOF using the virtual object (S330); and determining whether the object is located inside or outside the outline of the parking path by comparing the real indirect wave TOF, which is the indirect wave TOF among the received ultrasonic wave TOFs, with the sum of the virtual indirect wave TOF and a predetermined indirect wave offset (S340).

That is, the second embodiment of the determining method for obstacles on and around the parking path using ultrasonic waves differs from the first embodiment in that the indirect wave offset is further considered in determining whether the object is located inside or outside the outline of the parking path.

Accordingly, in the determining of whether an ultrasonic noise exists (S310), it is determined that the ultrasonic noise exists when both the direct wave TOF and the indirect wave TOF exist and neither the dynamic noise nor the static noise exists in the received ultrasonic wave TOFs, as in the first embodiment of the determining method for obstacles on and around the parking path using ultrasonic waves.

In addition, the virtual object is generated at the intersection at which a circle having the center at the position of the sensor emitting and receiving the direct wave and the radius of the direct wave hTOF crosses the outline of the parking path.

In addition, the virtual indirect wave TOF is generated as the sum of a straight line connecting the position of the sensor emitting and receiving the direct wave to the virtual object and a line connecting the virtual object to the position of the sensor receiving the indirect wave.

Figure 9:
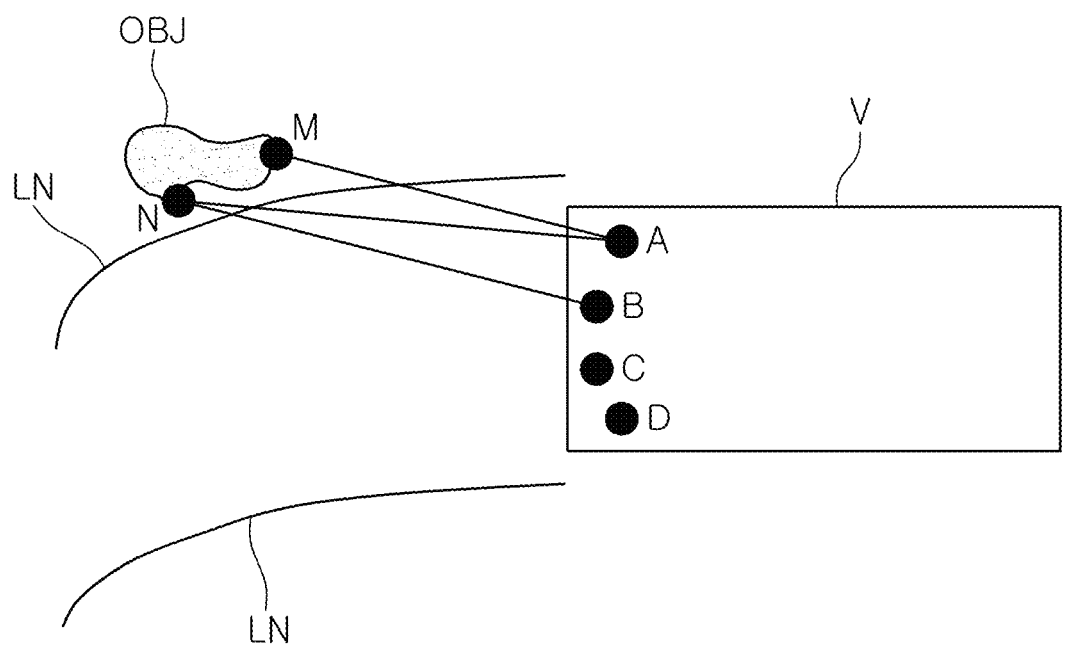
FIG. 9 is a view showing a direct wave and an indirect wave being reflected by an object having a volume.

It is to be noted that the second embodiment of the determining method for obstacles on and around the parking path using ultrasonic waves employs the indirect wave offset so as to take into consideration the reality that, as illustrated in FIG. 9, the object detected by the sensor is an object OBJ that actually has the volume and that, when the ultrasonic waves emitted by the same sensor are received as a direct wave and an indirect wave after being reflected by the object, the direct wave and the indirect wave may have been reflected at different points of the object.

That is, while, in the first embodiment of the determining method for obstacles on and around the parking path using ultrasonic waves, the object by which the direct wave and indirect wave are reflected is treated as a single point such that whether or not the object is located inside the parking path is determined on the assumption that the direct wave and the indirect wave are reflected at the identical point of the object, the second embodiment employs the indirect wave offset so as to take into consideration the reality that, when the ultrasonic wave is reflected by an object that actually has the volume, the reflection point of the direct wave and the reflection point of the indirect wave may differ even for the same object.

Figure 10:
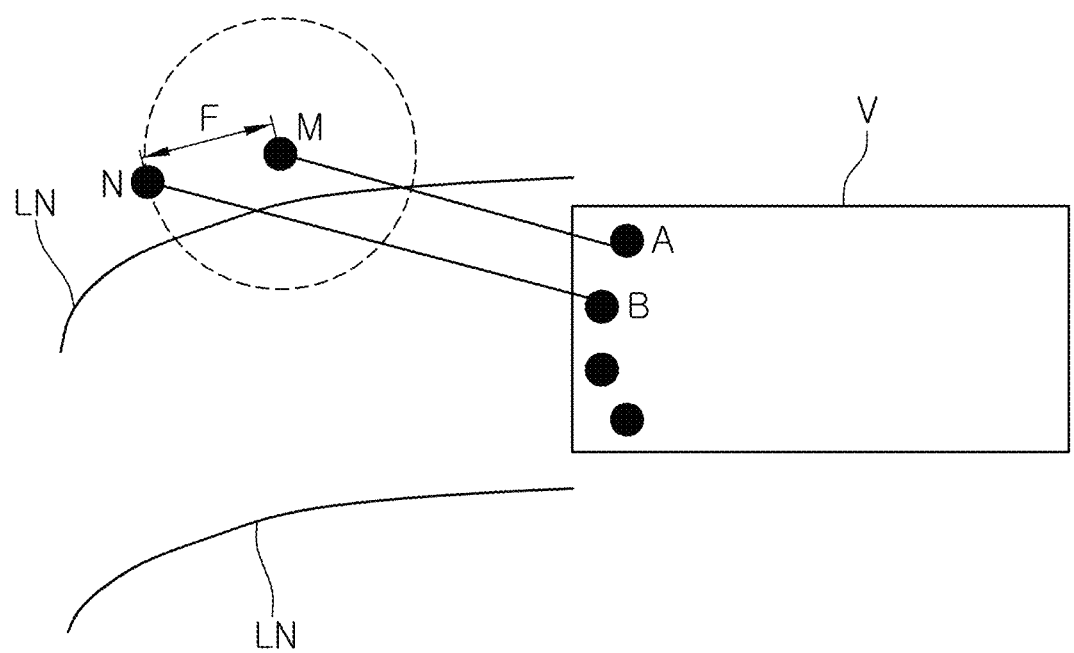
FIG. 10 is a view illustrating modeling of an object having a volume into a virtual circle having the radius F.

Assuming that the direct wave and indirect wave are reflected at two different points M and N of the same object, as shown in FIG. 10, the ultrasonic probability density function of the point N, which is assumed to be the reflection point of the indirect wave, being located on a circle that has the radius F of the distance between the two points and the center at the point M, which is assumed to be the reflection point of the direct wave, is calculated. Then, the indirect wave offset is set using the difference between the real indirect wave hTOF and the ideal indirect wave hTOF, assuming that the indirect wave is reflected at a point at which the probability of the point N being located is the highest based on the ultrasonic probability density function.

Here, the ideal indirect wave hTOF is conceptually distinct from the virtual indirect wave hTOF.

That is, virtual indirect wave hTOF is calculated by dividing by two the sum of a straight line connecting the position of the sensor emitting and receiving the direct wave (sensor receiving the indirect wave) to a virtual object and a straight line connecting the virtual object to the position of the sensor receiving the indirect wave, the virtual object being generated at the intersection at which a circle having the center at the sensor emitting and receiving the direct wave and the radius of the direct wave hTOF crosses the outline of the parking path. The ideal indirect wave hTOF is calculated by dividing by two the sum of a straight line connecting the position of the sensor emitting and receiving the direct wave (sensor receiving the indirect wave) to the point at which the probability of the point N being located is the highest based on the ultrasonic probability density function and a straight line connecting the point at which the probability of the point N being located is the highest to the position of the sensor receiving the indirect wave.

Figure 11:
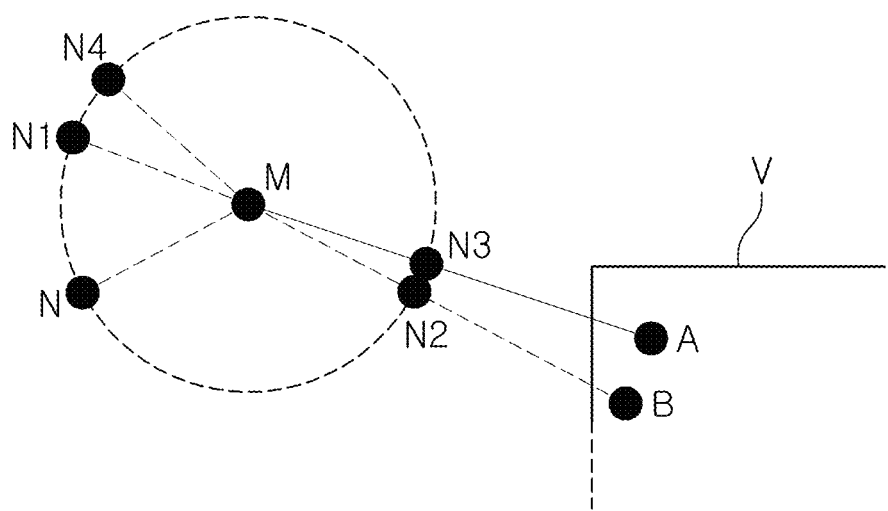
FIG. 11 is a view describing a possibility of a point N being variously located on the circle in FIG. 10.

It is to be noted that FIG. 11 illustrates with the points N1 to N4 that the point N may be variously located on a circle as drawn in FIG. 10.

In addition, the plane formed by the circle formed by the two points M and N is assumed to be parallel to the plane formed by the sensors.

That is, the sensors may be regarded as disposed along the edge of the vehicle at the same height in the vehicle to form a plane and the circle formed by the two points M and N of the object may be regarded as formed on a plane parallel to the plane formed by the sensors so that a state in which the sensors and the two points M and N may be regarded as positioned on the same plane as illustrated in FIG. 9 is assumed.

Figure 12:
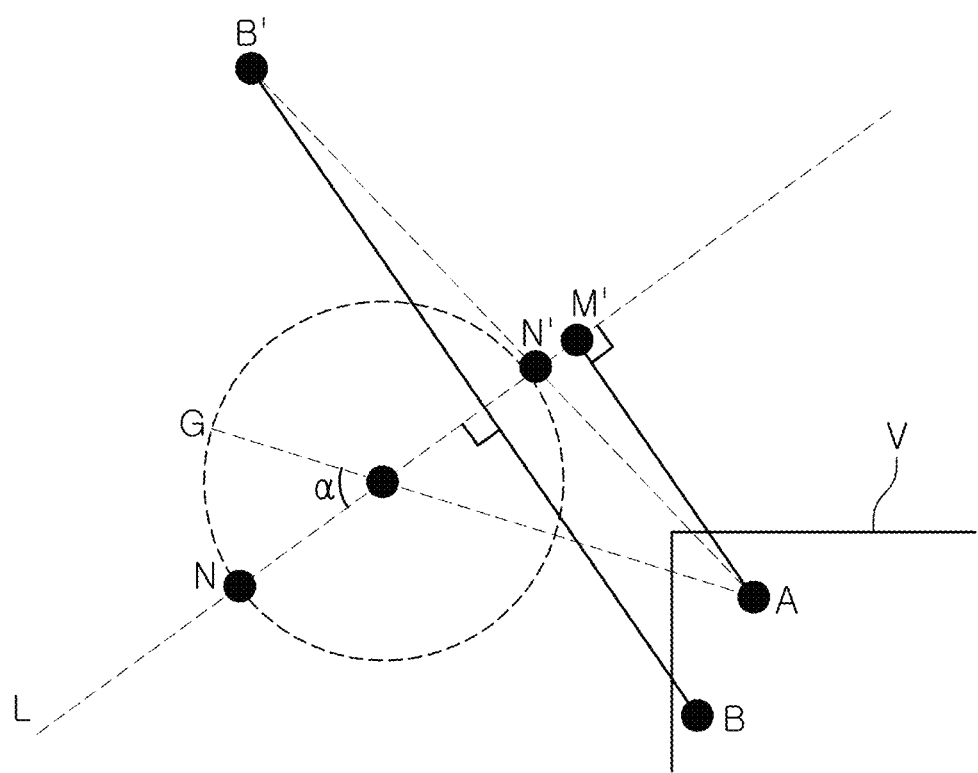
FIG. 12 is a view describing an ultrasonic probability density function.

FIG. 12 shows that the value of the ultrasonic probability density function is obtained from $$P\_m * P\_n$$

where P_m is the probability of M' coinciding with M, P_n is the probability of N' coinciding with N, M' is the point at which the direct wave TOF is minimized and N' is the point at which the indirect wave TOF is minimized on an infinite straight line L connecting the two points M and N, and the infinite straight is rotated around the point M. The probability P_m is:
- (distance between M' and N)/(distance between N and M) when M' is between M and N,
- 1 when M' is outside the interval between M and N on the side of M, or
- 0 when M' is outside the interval between M and N on the side of N.

The probability P_n is:
- (distance between N' and M)/(distance between N and M) when N' is between M and N,
- 1 when N' is outside the interval between M and N on the side of N, or
- 0 when N' is outside the interval between M and N on the side of M.

Here, the point M' at which the direct wave TOF is minimized on the infinite straight line connecting the two points M and N may be obtained by an intersection at which the infinite straight line crosses a line drawn from the sensor emitting and receiving the direct wave perpendicular to the infinite straight line, and the point N' at which the indirect wave TOF is minimized on the infinite straight line may be obtained by an intersection at which the infinite straight line crosses a straight line connecting the point axially symmetric to the position of the sensor receiving the indirect wave to the sensor emitting and receiving the direct wave.

The determination of M' and N' as described above is based on a rational inference that, of the reflection points of an object, the point to which the moving distance of the ultrasonic wave is the shortest has the highest probability of becoming an actual reflection point of the direct wave and indirect wave.

As described above, the probability P_m of M' coinciding with M at the respective locations while the infinite straight is rotated around the point M is:
- (distance between M' and N)/(distance between N and M) when M' is between M and N,
- 1 when M' is outside the interval between M and N on the side of M, or
- 0 when M' is outside the interval between M and N on the side of N.

The probability P_n of N' coinciding with N is:
- (distance between N' and M)/(distance between N and M) when N' is between M and N,
- 1 when N' is outside the interval between M and N on the side of N, or
- 0 when N' is outside the interval between M and N on the side of M.

The value of the ultrasonic wave probability density function is obtained from P_m*P_n. using the values of P_m*P_n.

In FIG. 12, the ultrasonic probability density function may be regarded as a function having a as an independent variable and P_m*P_n as a dependent variable, in which a is the angle between line segments G-M and M-N, wherein the point G is a point at which a straight line passing through the sensor A emitting and receiving the direct wave and the point M crosses a circle formed by rotating the point N around the point M.

Figure 13:
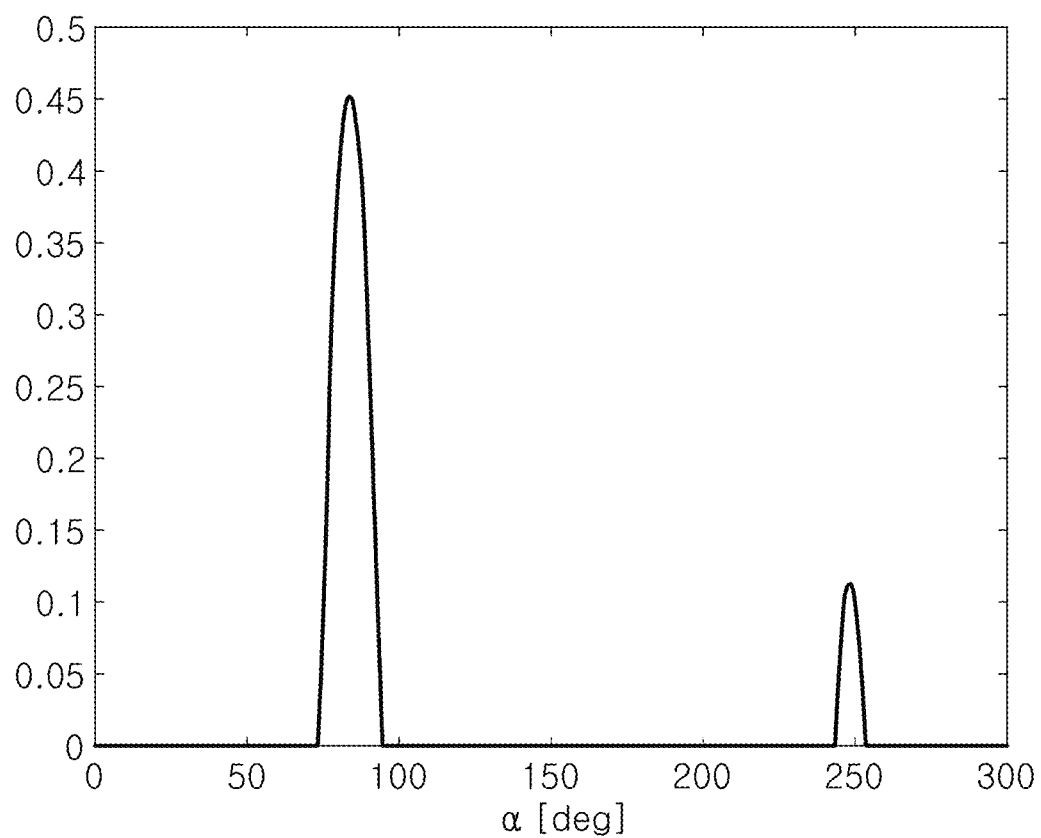
FIG. 13 is a graph showing values of an ultrasonic probability density function according to changes of a in the same situation as in FIG. 12.

Since the line segment M-N is a line segment on the infinite straight line L, a changes as the infinite straight line is rotated and the value of the ultrasonic probability density function changes as well. As shown in FIG. 13, the probability density is high when a takes certain values.

Figure 14:
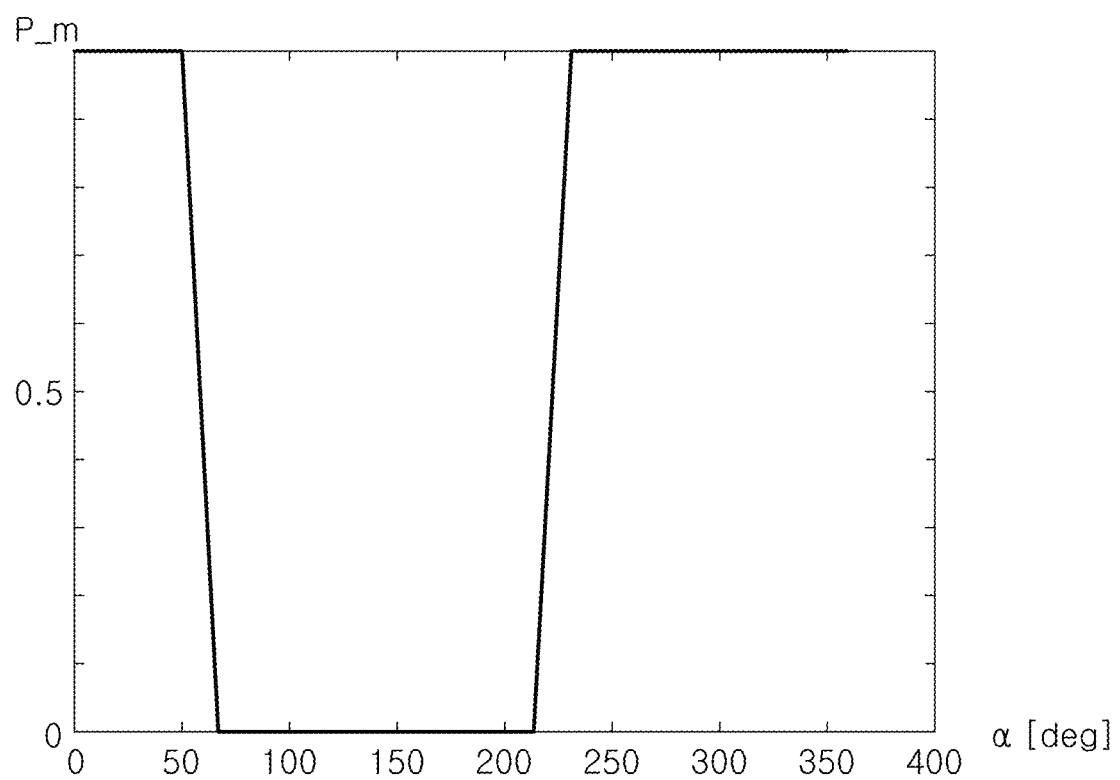
Figure 15:
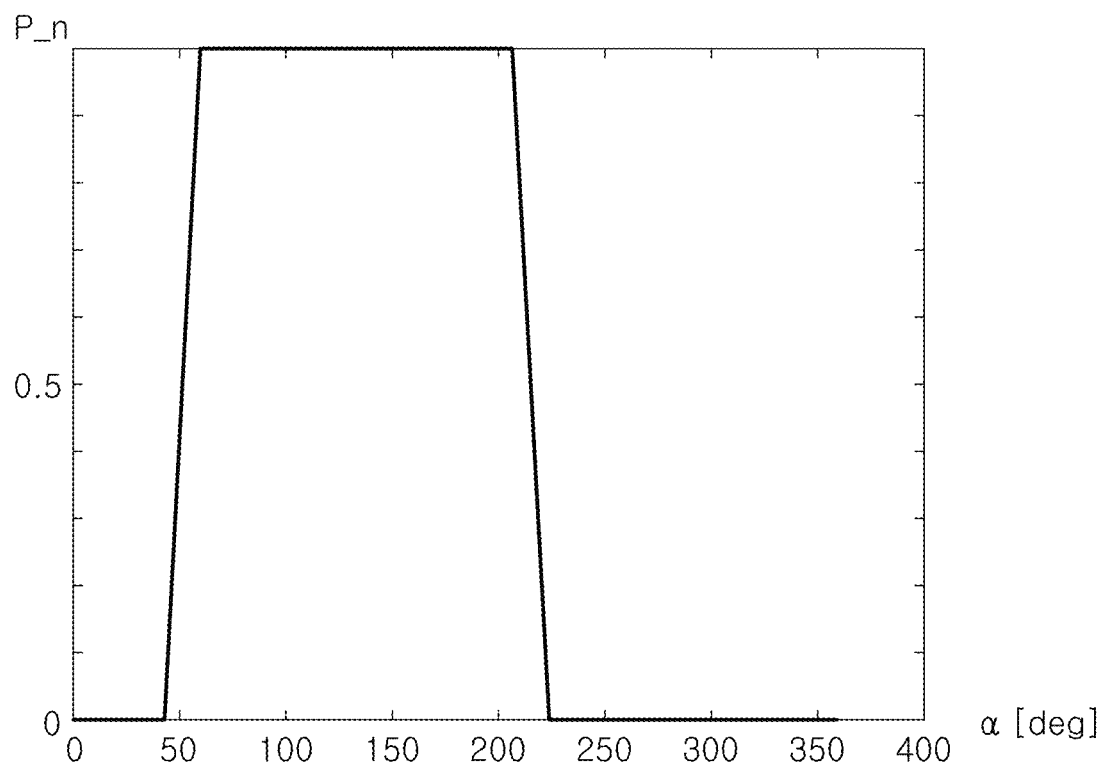

Actually, FIG. 13 is obtained by multiplying the values in FIG. 14 by the values in FIG. 15. FIG. 14 is a graph showing changes of P_m as a changes, P_m being the probability of M' coinciding with M which is the reflection point of the real direct wave with M' being closer to M than to N, and FIG. 15 is a graph showing changes of P_n as a changes, P_n being the probability of N' coinciding with N which is the reflection point of the real indirect wave with N' being closer to N than to M.

Accordingly, the ultrasonic probability density function in FIG. 13 has peak values greater than zero in the intervals of a, in which the probability of N' coinciding with N is actually the highest while the probability of M' coinciding with M is sufficiently secured, and the probability of the indirect wave being actually reflected in these intervals is the highest.

Figure 16:
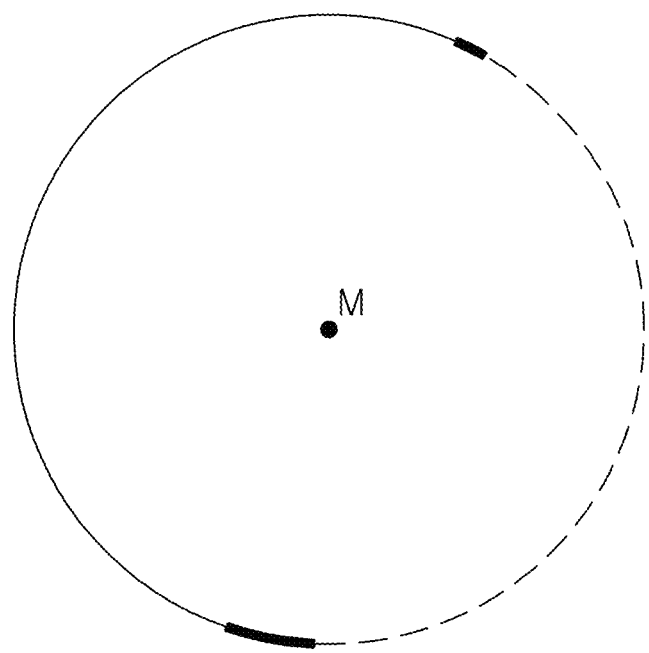
FIG. 16 is a view showing a portion in which a real indirect wave hTOF is greater than an ideal indirect wave hTOF, a portion in which the real indirect wave hTOF is less than the ideal indirect wave hTOF, and portions in which values of an ultrasonic probability density function are greater than zero on a circle drawn under the same condition as in FIG. 12.

FIG. 16 is a view showing a circle drawn under the same condition as in FIG. 12, wherein the portion in which a real indirect wave hTOF is greater than an ideal indirect wave hTOF is marked by a solid line, the portion in which real indirect wave hTOF is less than the ideal indirect wave hTOF is marked by a dotted line, and only the portions in which the value of the ultrasonic probability density function is greater than zero are marked by thick solid lines. The probability of the indirect wave being actually reflected in the intervals marked by the thick solid lines is high. That is, the probability of N being actually located in the intervals marked by the thick solid lines is high. Of course, the probability of the real direct wave being reflected at point M is high.

Figure 17:
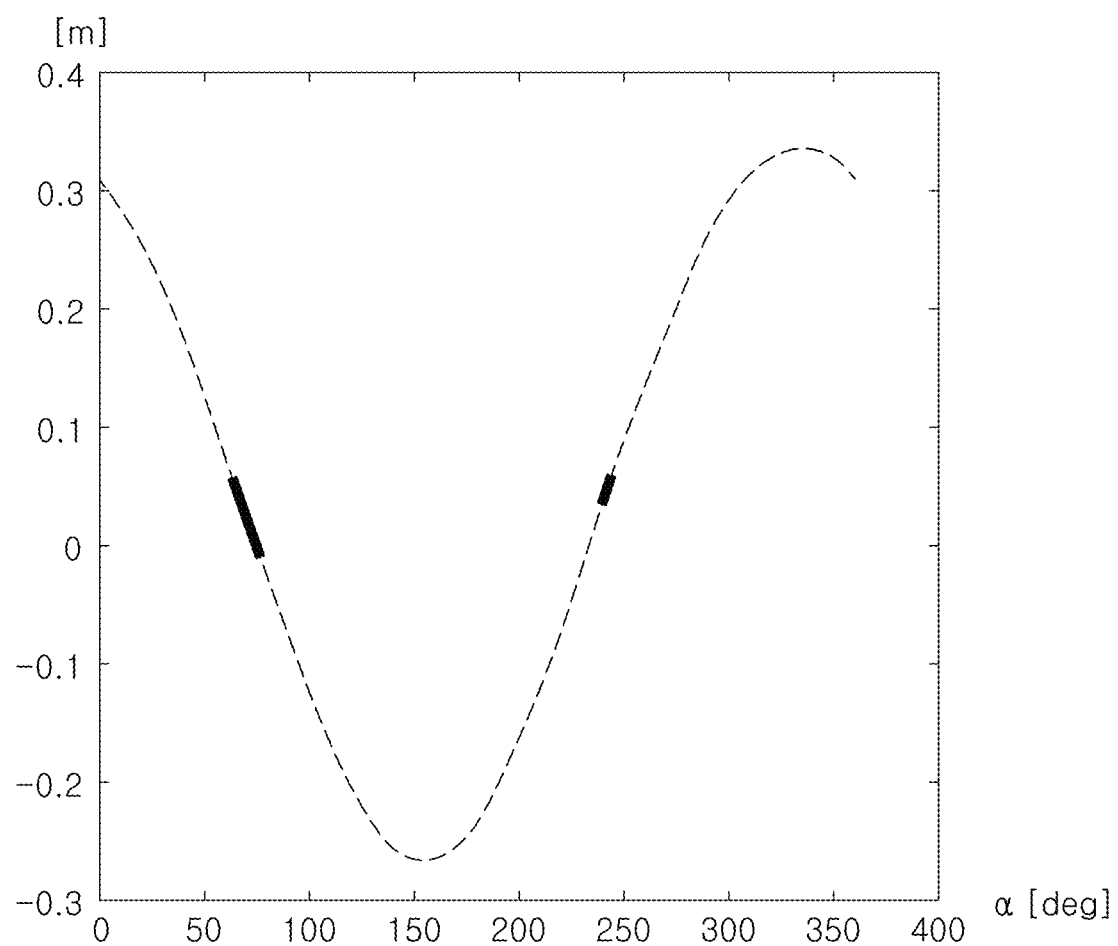
FIGS. 17 and 18 are graphs respectively showing changes in the difference between a real indirect wave hTOF and an ideal indirect wave hTOF as a increases.

FIG. 17 is a view showing changes in the difference between the real indirect wave hTOF and the ideal indirect wave hTOF as a increases. The portion marked by a solid line is a portion in which P_m>0 and P_n>0, and thus, the value of the ultrasonic probability density function is greater than zero.

It turns out from FIG. 17 that the difference between the real indirect wave hTOF and the ideal indirect wave hTOF is in the range of −1 cm to 5 cm in the interval in which P_m>0 and P_n>0.

Figure 18:
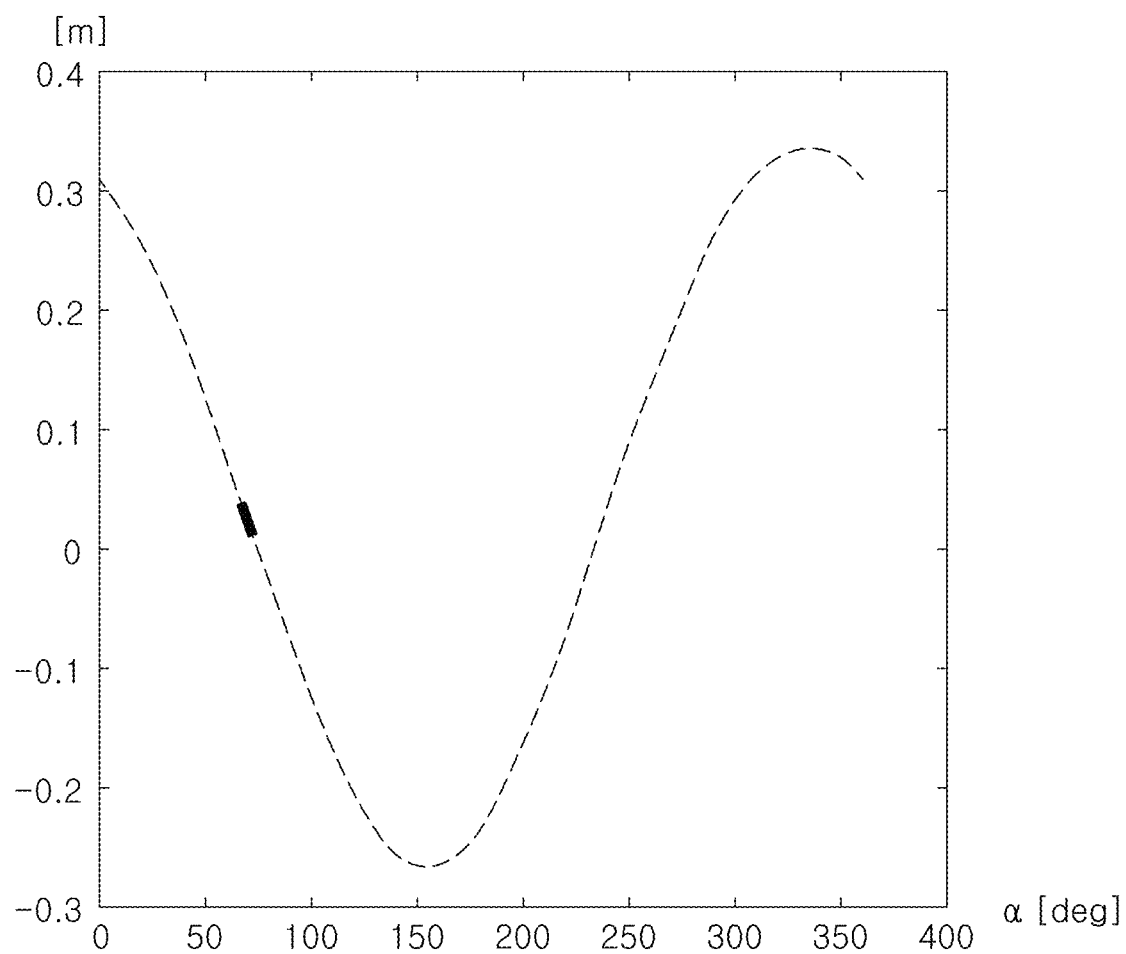

FIG. 18 is a view showing changes in the difference between the real indirect wave hTOF and the ideal indirect wave hTOF as a increases as shown in FIG. 17. The portion marked by a solid line is a portion in which the condition that P_m>0.5 and P_n>0.5 is satisfied.

That is, FIG. 18 shows what range the difference between the real indirect wave hTOF and the ideal indirect wave hTOF may be in in the interval that the point N is expected to be in with a probability higher than the probability described in FIG. 17. It turns out that the difference between the real indirect wave hTOF and the ideal indirect wave hTOF is in the range of 1 cm to 3 cm.

Accordingly, it turns out that the range of difference between the real indirect wave hTOF and the ideal indirect wave hTOF obtained in the interval, in which the point N is expected to exist with a high probability and in which the probability of the indirect wave being reflected is high, may serve as a basis for setting the indirect wave offset correctly.

Figure 20:
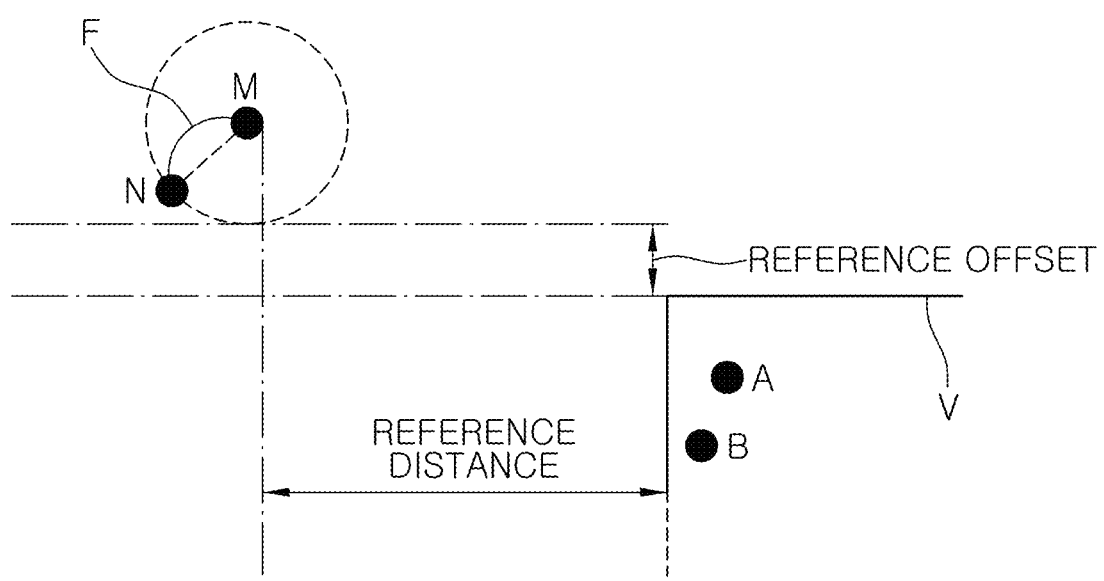
FIG. 20 is a view describing an experiment condition employed in deriving the results in FIG. 19.

FIG. 19 is a table showing the minimum values and the maximum values of the difference between the real indirect wave hTOF and the ideal indirect wave hTOF and values of P_max which is the difference between the real indirect wave hTOF and the ideal indirect wave hTOF at the point where the value of the ultrasonic probability density function is maximized as a increases in the interval in which the condition that P_m>0.5 and P_n>0.5 is satisfied in a plurality of experiments under the same condition as in FIG. 20.

In FIG. 20, A and B denote sensors mounted in the vehicle, and it is assumed that the object assumed to include the two points M and N is a circle having the center at M and the radius of F, that the point M is spaced apart from the vehicle in the parking path direction by a predetermined distance in which the object is detectable by the ultrasonic wave and that the circle is spaced apart from the outline of the parking path by a predetermined reference offset.

The table in FIG. 19 summarizes the result of the experiments in which the distance F between point M and point N changes over 20 cm, 30 cm, and 50 cm to take into consideration objects of various sizes that may exist in and around the parking path, the reference distance to the object changes over 1.8 m and 1.2 m to take in consideration various sensing ranges of the sensors, and the reference offset changes over 0 cm and 10 cm to take into consideration the case where the real object touches the outline of the parking path and the case where the real object is spaced apart from the outline by the reference offset.

That is, experiments are conducted under various conditions to sufficiently reflect the real situations that may arise in the process of determining through the sensors the location of the objects that may exist in and around the parking path that the vehicle is to move on for parking and to calculate the indirect wave offset based thereon.

Here, the indirect wave offset may be determined in consideration of the minimum value of P_max which is the difference between the real indirect wave hTOF and the ideal indirect wave hTOF at the point where the value of the ultrasonic probability density function in FIG. 19 is maximized.

Assuming that the indirect wave is reflected at the point at which the probability of the point N being located is the highest from the ultrasonic probability density function, P_max corresponds to the difference between the real indirect wave hTOF and the ideal indirect wave hTOF.

FIG. 19 shows that the minimum value of P_max is 0.011 when F=20 cm, the reference distance is 1.8 m and the reference offset is 0 cm so that, based on this value, the indirect wave offset is set to 0.01.

That is, of the data in FIG. 19, F is small, which means that the volume of the object is relatively small, and the reference offset is zero so that the indirect wave offset is determined based on the object that touches the parking path.

Of course, when the object has a smaller F and thus relatively smaller volume, the value of P_max may turn out to be smaller, but P_max for the object with the most appropriate value of F may be calculated in practical consideration of various aspects such as the vehicle, sensors, and the like and be put into use.

In the determining of whether the object is located inside or outside the outline of the parking path (S340), when the sensor emitting and receiving the direct wave is located on the outer side of the parking path, compared with the sensor receiving the indirect wave, it is determined that the object is located outside the outline of the parking path if the real indirect wave hTOF is greater than the sum of the virtual indirect wave hTOF and the indirect wave offset and that the object is located inside the outline of the parking path if the real indirect wave hTOF is equal to or less than the sum of the virtual indirect wave hTOF and the indirect wave offset.

That is, in contrast to the first embodiment of the determining method for obstacles on and around the parking path using ultrasonic waves, the real indirect wave hTOF is not simply compared with the virtual indirect wave hTOF but is compared with the sum of the virtual indirect wave hTOF and the indirect wave offset so that it is determined that the object is located outside the outline of the parking path if the real indirect wave hTOF is greater.

Accordingly, in contrast to the first embodiment, it may be more conservatively checked that an object actually having the volume does not exist inside the outline of the parking path.

In addition, as described above, P_max when the reference offset is 0 cm is used as the indirect wave offset, and FIG. 19 shows that P_max tends to be smaller when the reference offset is 0 cm than when the reference offset is 10 cm, so that, when it is determined that the object is located outside the parking path based on the comparison between the real indirect wave hTOF and the sum of the indirect wave offset determined using the P_max as described above and the virtual indirect wave hTOF, it is naturally determined that an object with a reference offset of 10 cm is located outside the parking path. Accordingly, when the indirect wave offset is set using the minimum P_max in FIG. 19 as described, it may be checked with sufficient reliability that the object does not exist in the parking path.

Of course, also in the second embodiment, a plurality of sensors mounted in the vehicle sequentially emit ultrasonic waves and the steps as described above are repeatedly performed by two adjacent sensors each time the respective sensors receive the ultrasonic waves so that whether the obstacle on and around the parking path is located inside the parking path may be determined more accurately.

Figure 30:
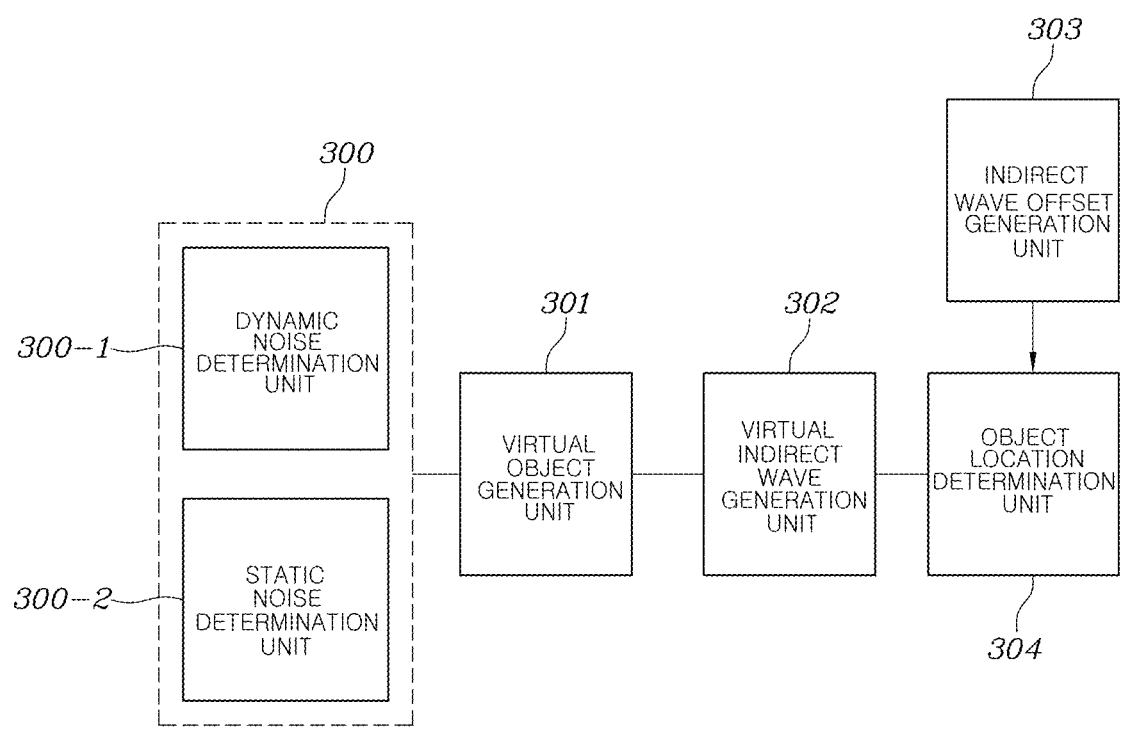
FIG. 30 is a view showing an embodiment of determining apparatus for obstacles on and around a parking path using ultrasonic waves, the apparatus being configured to implement the second embodiment of the determining method for obstacles on and around a parking path using ultrasonic waves as shown in FIG. 8.

FIG. 30 shows that determining apparatus for obstacles on and around the parking path using ultrasonic waves, the apparatus being configured to implement the second embodiment of the determining method for obstacles on and around the parking path using the ultrasonic wave, may be configured to include a noise determination unit 300 determining whether an ultrasonic noise exists in the TOFs of the ultrasonic waves reflected by an object and received; a virtual object generation unit 301 generating a virtual object on an outline of the parking path that the vehicle is to move on based on the received ultrasonic wave TOF when the noise determination unit 300 determines that no ultrasonic noise exists; a virtual indirect wave generation unit 302 generating a virtual indirect wave TOF using the virtual object generated by the virtual object generation unit 301; and an object location determination unit 304 determining whether the object is located inside or outside the outline of the parking path by comparing the real indirect wave TOF, which is the indirect wave TOF among the received ultrasonic wave TOFs, with the sum of the virtual indirect wave TOF generated by the virtual indirect wave generation unit 302 and a predetermined indirect wave offset generated by an indirect wave offset generation unit 303.

The noise determination unit 300 may be configured to include a dynamic noise determination unit 300-1 and a static noise determination unit 300-2 and determine that no ultrasonic noise exists when both the direct wave TOF and the indirect wave TOF exist and neither the dynamic noise nor the static noise exists in the received ultrasonic wave TOFs.

The dynamic noise determination unit 300-1 may be configured to determine that the dynamic noise is generated when $$d(\text{direct wave } h\text{TOF}) > Vdt,$$

where direct wave $h$TOF=direct wave TOF/2, $$d(\text{direct wave } h\text{TOF}) = \text{direct wave } h\text{TOF}_{t=n} - \text{direct wave } h\text{TOF}_{t=n-1}[m],$$

V: vehicle speed, and
dt: ultrasonic update cycle [ms].

The static noise determination unit 300-2 may be configured to determine that the static noise is generated when $$|\text{direct wave } h\text{TOF} - \text{indirect wave } h\text{TOF}| > \text{distance between sensors}/2,$$

where $h$TOF=TOF/2 and distance between sensors: distance between the sensor emitting and receiving the direct wave and the sensor receiving the indirect wave.

The virtual object generation unit 301 may be configured to generate the virtual object at the intersection at which a circle having the center at the position of the sensor emitting and receiving the direct wave and the radius of direct wave hTOF crosses the outline of the parking path.

The virtual indirect wave generation unit 302 may be configured to generate the virtual indirect wave TOF as the sum of a straight line connecting the position of the sensor emitting and receiving the direct wave to the virtual object and a straight line connecting the virtual object to the position of the sensor receiving the indirect wave.

Assuming that the direct wave and indirect wave are reflected at two different points M and N of the same object, the indirect wave offset generation unit 303 may be configured to calculate the ultrasonic probability density function of the point N, which is assumed to be the reflection point of the indirect wave, being located on a circle having the radius F of the distance between the two points and the center at the point M, which is assumed to be the reflection point of the direct wave, and may set the indirect wave offset using the difference between the real indirect wave hTOF and the ideal indirect wave hTOF, assuming that the indirect wave is reflected at the point at which the probability of the point N being located is the highest based on the ultrasonic probability density function.

Assuming that the indirect wave is reflected at the point at which the probability of the point N being located is the highest based on the ultrasonic probability density function, the indirect wave offset may be set using the difference between the real indirect wave hTOF and the ideal indirect wave hTOF.

The ideal indirect wave hTOF may be calculated by dividing by two the sum of a straight line connecting the position of the sensor emitting and receiving the direct wave (sensor receiving the indirect wave) to the point at which the probability of the point N being located is the highest based on the ultrasonic probability density function and a straight line connecting the point at which the probability of the point N being located is the highest to the position of the sensor receiving the indirect wave.

The plane formed by a circle formed by the two points M and N is assumed to be parallel to the plane formed by the sensors.

The value of the ultrasonic probability density function is obtained from $P\_m * P\_n$ where $P\_m$ is the probability of M' coinciding with M, $P\_n$ is the probability of N' coinciding with N, M' is a point at which the direct wave TOF is minimized and N' is a point at which the indirect wave TOF is minimized on the infinite straight line connecting the two points M and N, and the infinite straight line is rotated around M. The probability $P\_m$ is:

(distance between M' and N)/(distance between N and M) when M' is between M and N,
1 when M' is outside the interval between M and N on the side of M, or
0 when M' is outside the interval between M and N on the side of N.

The probability of $P\_n$ is:
(distance between N' and M)/(distance between N and M) when N' is between M and N,
1 when N' is outside the interval between M and N on the side of N, or
0 when N' is outside the interval between M and N on the side of M.

In addition, the value of the probability density function is obtained from $$P\_m * P\_n$$

where $P\_m$ is the probability of M' coinciding with M, $P\_n$ is the probability of N' coinciding with N, M' is the intersection at which an infinite straight line connecting the points M and N crosses a line drawn from the sensor emitting and receiving the direct wave perpendicular to the infinite straight line, N' is the intersection at which the infinite straight line crosses a straight line connecting the sensor emitting and receiving the direct wave to a point axially symmetric to the position of the sensor receiving the indirect wave with respect to the infinite straight line, and the infinite straight line is rotated. The probability of $P\_m$ is:

(distance between M' and N)/(distance between N and M) when M' is between M and N,
1 when M' is outside the interval between M and N on the side of M, or
0 when M' is outside the interval between M and N on the side of N.

The probability $P\_n$ is:
(distance between N' and M)/(distance between N and M) when N' is between M and N,
1 when N' is outside the interval between M and N on the side of N, or
0 when N' is outside the interval between M and N on the side of M.

In FIG. 20, it is assumed that the object assumed to include the two points M and N is a circle having the center at M and the radius of F, that the point M is spaced apart from the vehicle in the parking path direction by a predetermined distance in which the object is detectable by the ultrasonic wave and that the circle is spaced apart from the outline of the parking path by a predetermined reference offset.

When the sensor emitting and receiving the direct wave is located on the outer side of the parking path, compared with the sensor receiving the indirect wave, the object location determination unit 304 may be configured to determine that the object is located outside the outline of the parking path if the real indirect wave hTOF is greater than the sum of the virtual indirect wave hTOF and the indirect wave offset and that the object is located inside the outline of the parking path if the real indirect wave hTOF is equal to or less than the sum of the virtual indirect wave hTOF and the indirect wave offset.

Figure 21:
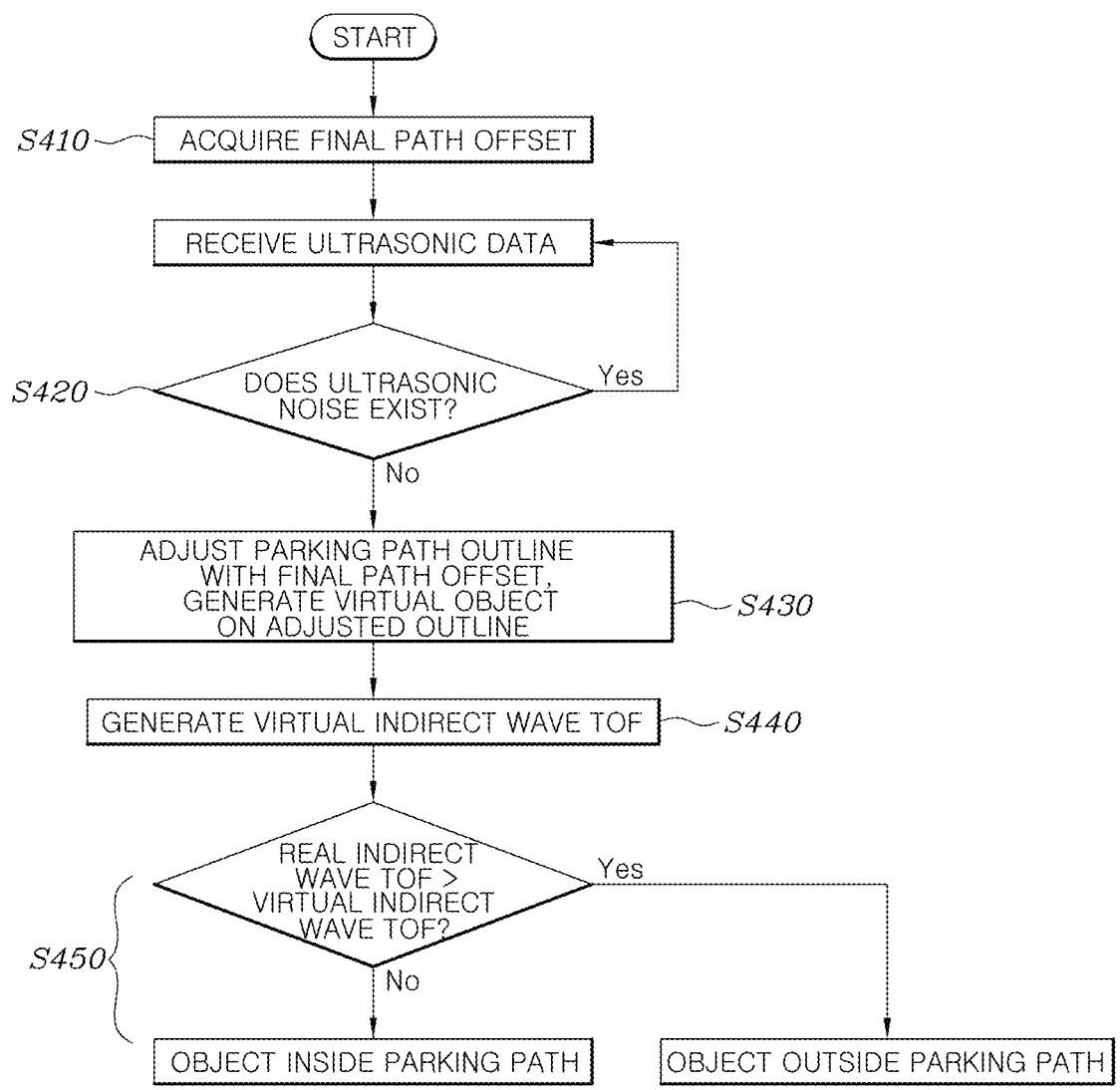
FIG. 21 is a flowchart showing a third embodiment of the determining method for obstacles on and around a parking path using ultrasonic waves.

FIG. 21 shows that a third embodiment of the determining method for obstacles on and around a parking path using ultrasonic waves includes acquiring a final path offset on the parking path that the vehicle is to move on (S410); determining whether an ultrasonic noise exists in the TOFs of the ultrasonic waves reflected by an object and received (S420); adjusting the outline of the parking path that the vehicle is to move on by adding the final path offset when no noise exists and generating a virtual object on the adjusted outline based on the received ultrasonic wave TOF (S430); generating an indirect wave TOF using the virtual object (S440); and determining whether the object is located inside or outside the outline of the parking path by comparing the real indirect wave TOF, which is the indirect wave TOF among the received ultrasonic wave TOFs, with the virtual indirect wave TOF (S450).

That is, the third embodiment only differs from the first embodiment in that the location of the object is determined based on the outline of the parking path to which the final path offset is added when determining whether the object is inside or outside the outline of the parking path.

Accordingly, in the determining of whether an ultrasonic noise exists (S420), it is determined that no ultrasonic noise exists when both the direct wave TOF and the indirect wave TOF exist and neither the dynamic noise nor the static noise exists in the received ultrasonic wave TOFs.

In addition, the virtual object is generated at the intersection at which a circle having the center at the position of the sensor emitting and receiving the direct wave and the radius of the direct wave hTOF crosses the outline of the parking path adjusted by adding the final path offset.

In addition, the virtual indirect wave TOF is generated as the sum of a straight line connecting the position of the sensor emitting and receiving the direct wave to the virtual object and a line connecting the virtual object to the position of the sensor receiving the indirect wave.

Of course, in the determining of whether the object is located inside or outside the outline of the parking path (S450), when the sensor emitting and receiving the direct wave is located on the outer side of the parking path, compared with the sensor receiving the indirect wave, it is determined that the object is located outside the outline of the parking path if the real indirect wave hTOF is greater than the virtual indirect wave hTOF and that the object is located inside the outline of the parking path if the real indirect wave hTOF is equal to or less than the virtual indirect wave hTOF.

In addition, a plurality of sensors mounted in the vehicle sequentially emit ultrasonic waves and the steps as described above are repeatedly performed by two adjacent sensors each time the respective sensors emit the ultrasonic waves so that whether the obstacle on and around the parking path is located inside the parking path may be determined more accurately.

The final path offset is determined to be the path offset obtained when the value of a path probability density function is maximized as the path offset that is added to the outline of the parking path to cause the outline to move outward from the vehicle changes, wherein the path probability density function is defined as P_in*P_out, where P_in is the probability of determining that an obstacle is inside the outline of the parking path when the vehicle is moved along the parking path a plurality of times in a state where the obstacle is installed inside the outline of the parking path that the vehicle is to move on and P_out is the probability of determining that the obstacle is outside the outline when the vehicle is moved along the parking path a plurality of times in a state where the obstacle is installed outside the outline of the parking path that the vehicle is to move on.

That is, $$P\_in = \Sigma_{i=1}^{i=n} P\_in_i$$

where i is the number of times the vehicle is moved along the parking path of the vehicle (i=1, 2, 3 . . . n) and $P\_in_i$=[(the number of times the obstacle is determined to be inside the outline in the *i-th* movement)/(the number of times the obstacle is determined to be inside or outside the outline in the *i-th* movement)]*100, and $$P\_out = \Sigma_{i=1}^{i=n} P\_out_i$$

where i is the number of times the vehicle is moved along the parking path of the vehicle (i=1, 2, 3 . . . n) and $P\_out_i$=[(the number of times the obstacle is determined to be outside the outline in the *i-th* movement)/(the number of times the obstacle is determined to be inside or outside the outline in the *i-th* movement)]*100.

Actually, the probability P_in may be calculated by simulation while changing the path offset using the acquired ultrasonic wave TOF data as the vehicle is moved along the parking path a plurality of times in a state where the obstacle is installed inside the outline of the parking path that the vehicle is to move on.

Similarly, the probability P_out may be calculated by simulation while changing the path offset using the acquired ultrasonic wave TOF data as the vehicle is moved along the parking path a plurality of times in a state where the obstacle is installed outside the outline of the parking path that the vehicle is to move on.

Of course, it is preferable to install a plurality of types of obstacles on the parking path in turn and acquire the ultrasonic wave TOF data for each type of obstacle while moving the vehicle along the parking path a plurality of times.

Adjusting the outline of the parking path by adding the final path offset obtained by the method described above allows more accurate determination than the first embodiment of whether the object is located inside or outside the parking path while sufficiently taking into consideration errors of the parking path itself caused by vehicle speed, wheel slip, or the like and an object having the real volume.

Figure 31:
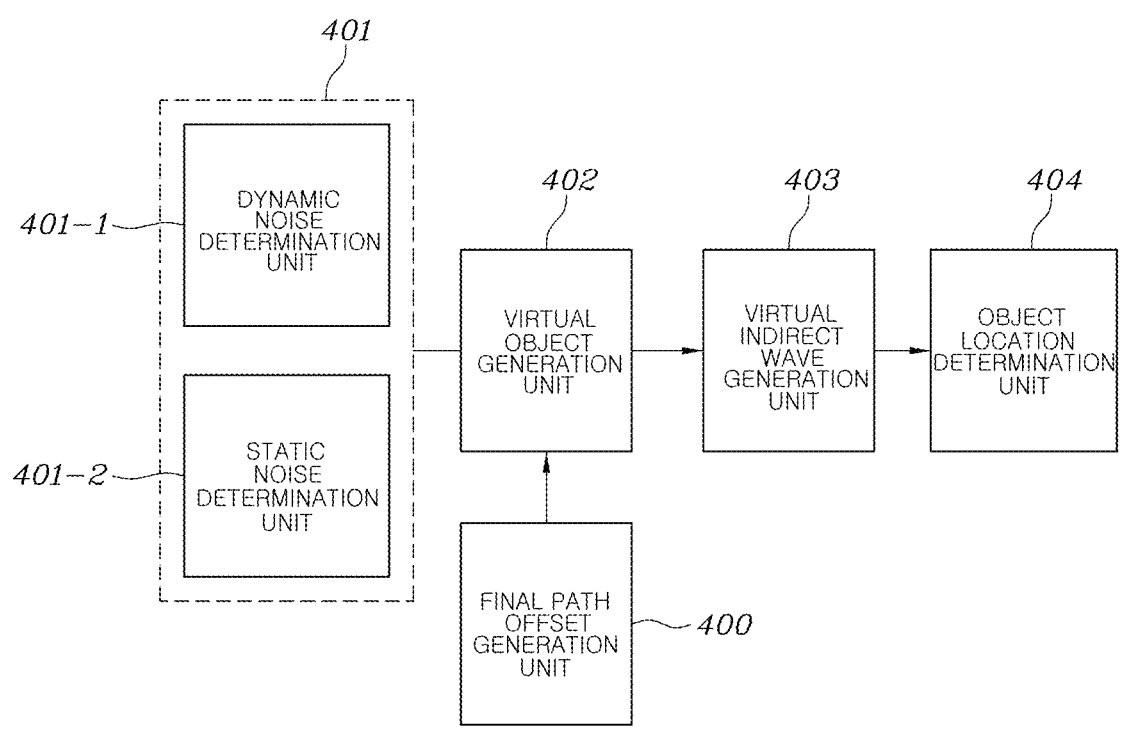
FIG. 31 is a view showing an embodiment of determining apparatus for obstacles on and around a parking path using ultrasonic waves, the apparatus being configured to implement the third embodiment of the determining method for obstacles on and around a parking path using ultrasonic waves as shown in FIG. 21.
Figure 32:
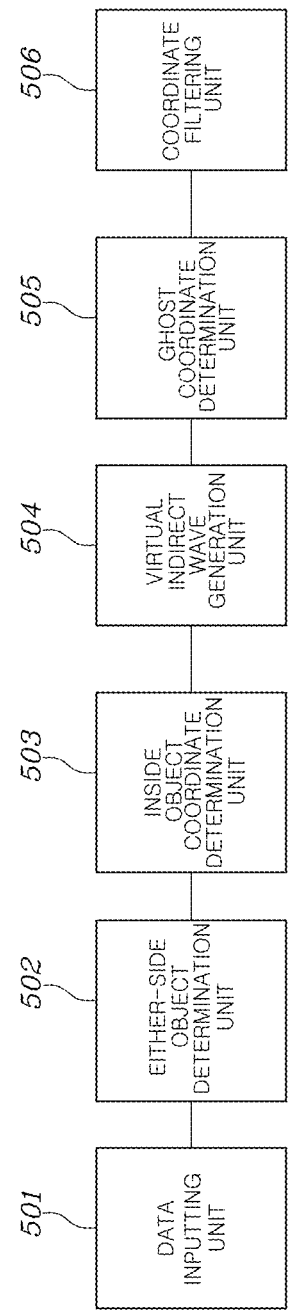
FIG. 32 is a view showing an embodiment of determining apparatus for obstacles on and around a parking path using ultrasonic waves, the apparatus being configured to implement the first embodiment of the obstacle filtering method on and around the parking path using ultrasonic waves as shown in FIG. 22.

FIG. 31 shows that determining apparatus for obstacles on and around the parking path using ultrasonic waves, the apparatus being configured to implement the third embodiment of the determining method for obstacles on and around the parking path using ultrasonic waves, may be configured to include a final path offset generation unit 400 generating a final path offset against the parking path the vehicle is to move on; a noise determination unit 401 determining whether the ultrasonic noise exists in TOFs of the ultrasonic waves reflected by the object and received; a virtual object generation unit 402 adjusting the outline of the parking path the vehicle is to move on by adding the final path offset generated by the final path offset generation unit 400 when the noise determination unit 401 determines that no ultrasonic noise exists and generating a virtual object based on the received ultrasonic wave TOF on the adjusted outline; a virtual indirect wave generation unit 403 generating a virtual indirect wave TOF using the virtual object generated by the virtual object generation unit 402; and an object location determination unit 404 determining whether the object is located inside or outside the outline of the parking path by comparing the real indirect wave TOF, which is the indirect wave TOF among the received ultrasonic wave TOFs, with the virtual indirect wave TOF generated by the virtual indirect wave generation unit.

The noise determination unit 401 may be configured to include a dynamic noise determination unit 401-1 and a static noise determination unit 401-2 and determine that no ultrasonic noise exists when both the direct wave TOF and the indirect wave TOF exist and that neither the dynamic noise nor the static noise exists in the received ultrasonic wave TOFs.

The dynamic noise determination unit 401-1 may be configured to determine that the dynamic noise is generated when $$d(\text{direct wave } h\text{TOF}) > Vdt$$

where direct wave $h\text{TOF} = \text{direct wave TOF}/2$, $dh\text{TOF} = h\text{TOF}_{t=n} - h\text{TOF}_{t=n-1} [m]$, V: vehicle speed, and dt: ultrasonic update cycle [ms].

The static noise determination unit 401-2 may be configured to determine that the static noise is generated when $$|\text{direct wave } h\text{TOF} - \text{indirect wave } h\text{TOF}| > \text{distance between sensors}/2$$

where $h\text{TOF} = \text{TOF}/2$ and distance between sensors: distance between the sensor emitting and receiving the direct wave and the sensor receiving the indirect wave.

The virtual object generation unit 402 may be configured to generate the virtual object at the intersection at which a circle having the center at the position of the sensor emitting and receiving the direct wave and the radius of the direct wave hTOF crosses the outline of the parking path adjusted by adding the final path offset.

The virtual indirect wave generation unit 403 may be configured to generate the virtual indirect wave TOF as the sum of a straight line connecting the position of the sensor emitting and receiving the direct wave to the virtual object and a straight line connecting the virtual object to the position of the sensor receiving the indirect wave.

When the sensor emitting and receiving the direct wave is located on the outer side of the parking path, compared with the sensor receiving the indirect wave, the object location determination unit 404 may be configured to determine that the object is located outside the outline of the parking path if the real indirect wave hTOF is greater than the virtual indirect wave hTOF and that the object is located inside the outline of the parking path if the real indirect wave hTOF is equal to or less than the virtual indirect wave hTOF.

The final path offset generation unit 400 may be configured to determine the final path offset to be the path offset obtained when the value of a path probability function is maximized as the path offset that is added to the outline of the parking path to cause the outline to move outward from the vehicle changes, wherein the path probability density function is defined as P_in*P_out, where P_in is the probability of determining that an obstacle is inside the outline of the parking path when the vehicle is moved along the parking path a plurality of times in a state where the obstacle is installed inside the outline of the parking path that the vehicle is to move on and P_out is the probability of determining that the obstacle is outside the outline when the vehicle is moved along the parking path a plurality of times in a state where the obstacle is installed outside the outline of the parking path that the vehicle is to move on.

That is, $$P\_in = \Sigma_{i=1}^{i=n} P\_in_i$$

where i is the number of times the vehicle is moved along the parking path of the vehicle (I=1, 2, 3 . . . n) and P_in =[(the number of times the obstacle is determined to be inside the outline in the *i-th* movement)/(the number of times the obstacle is determined to be inside or outside the outline in the *i-th* movement)]*100.

$$P\_out = \Sigma_{i=1}^{i=n} P\text{-out}_i,$$

where i is the number of times the vehicle is moved along the parking path of the vehicle (I=1, 2, 3 . . . n) and P_out=[(the number of times the obstacle is determined to be outside the outline in the *i-th* movement)/(the number of times the obstacle is determined to be inside or outside the outline in the *i-th* movement)]*100.

The probability P_in may be calculated by simulation while changing the path offset using the acquired ultrasonic wave TOF data as the vehicle is moved along the parking path a plurality of times in a state where the obstacle is installed inside the outline of the parking path that the vehicle is to move on, and the probability P_out may be calculated by simulation whiling changing the path offset using the acquired ultrasonic wave TOF data as the vehicle is moved along the parking path a plurality of times in a state where the obstacle is installed outside the outline of the parking path that the vehicle is to move on.

Figure 22:
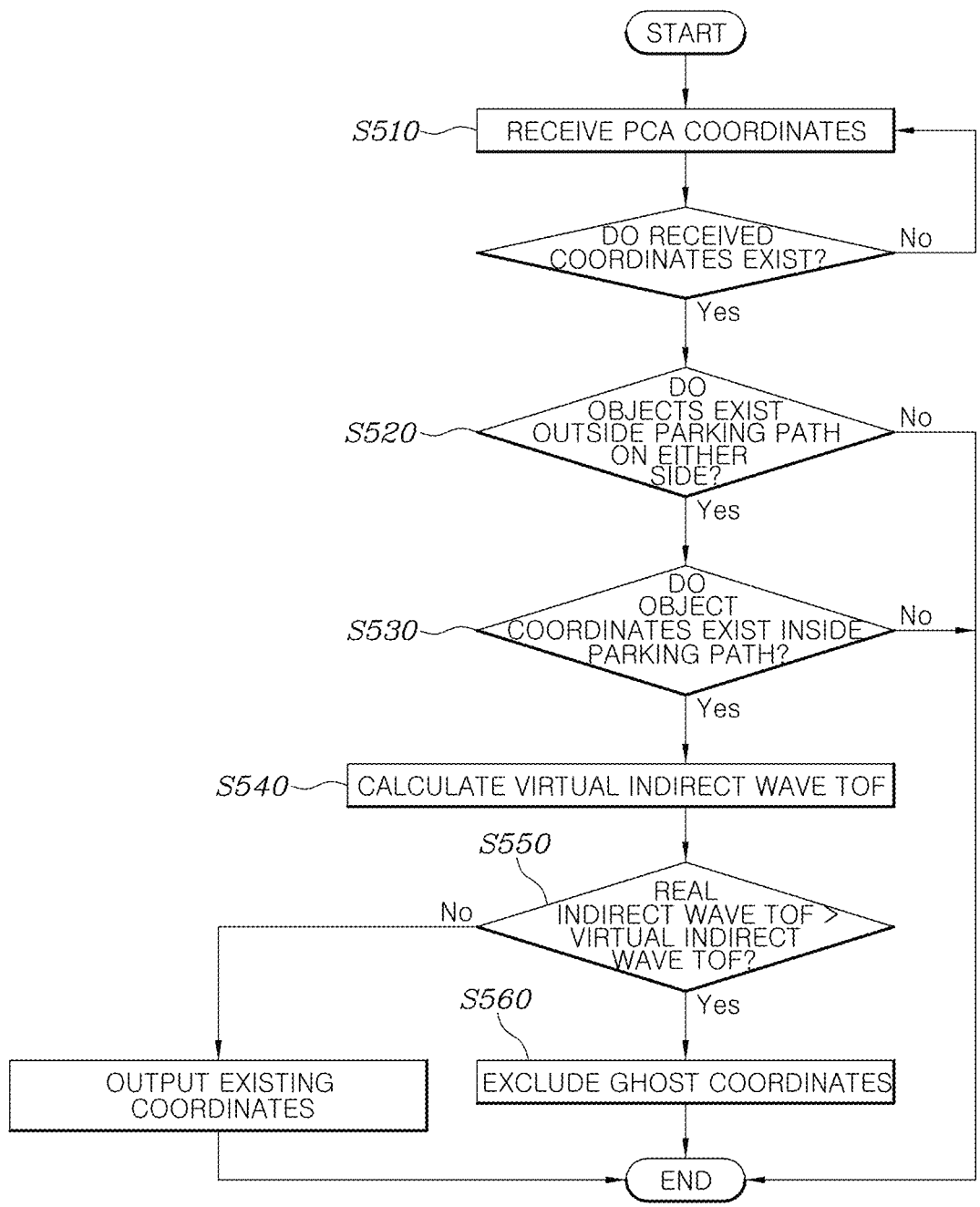
FIG. 22 is a flowchart showing a first embodiment of an obstacle filtering method on and around a parking path using ultrasonic waves.

FIG. 22 shows that a first embodiment of an obstacle filtering method on and around the parking path using ultrasonic waves includes receiving an input of coordinates of objects on and around the parking path that the vehicle is to drive on (S510); determining whether the objects exist outside the parking path on either side based on the received object coordinates (S520); determining whether object coordinates inside the parking path exist among the received object coordinates if the objects exist outside the parking path on either side (S530); calculating the virtual indirect wave TOF by two sensors in the center of the vehicle among a plurality of sensors disposed in the vehicle width direction if object coordinates inside the parking path exist (S540); determining whether the object coordinates inside the parking path are ghost coordinates based on the comparison between the virtual indirect wave TOF and the real indirect wave TOF (S550); and removing the object coordinates inside the parking path if the object coordinates inside the parking path are ghost coordinates (S560).

In the receiving of the coordinates of objects on and around the parking path that the vehicle is to drive on (S510), the coordinates of the object on and around the parking path may be received from a conventional parking assist device such as a parking collision avoidance assist (PCA) device and the like.

Figure 23:
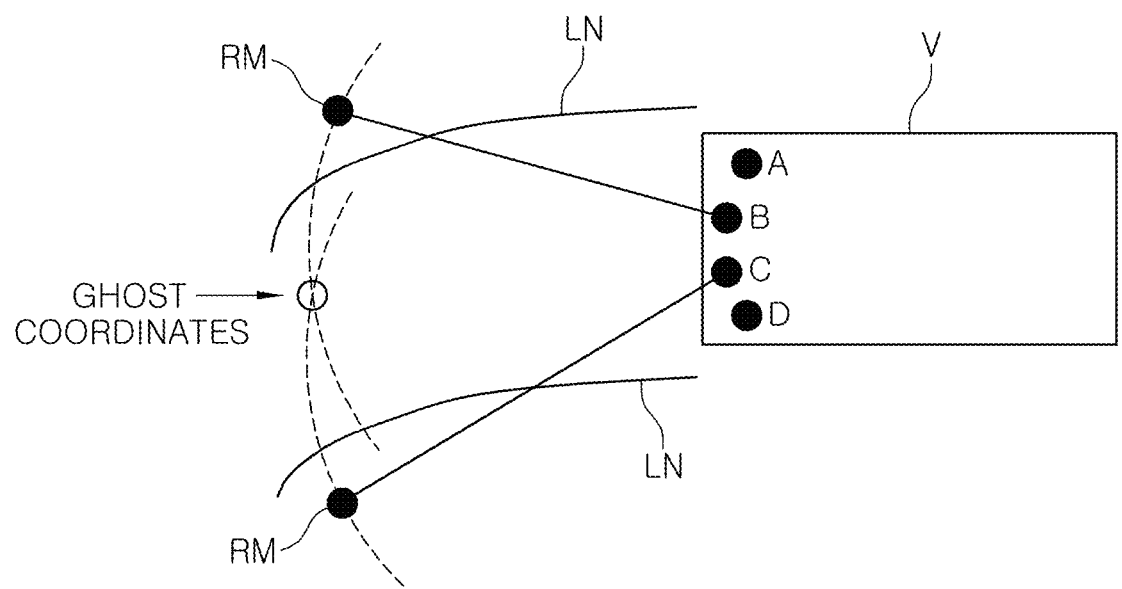
FIG. 23 is a view showing the generation of ghost coordinates inside a parking path when real objects exist outside a parking path on each side.

The ghost coordinates may be included in the object coordinates inputted as described above, and the present embodiment is for removing the ghost coordinates by filtering when the ghost coordinates as shown in FIG. 23 are included among the inputted object coordinates.

In the conventional parking assist device such as PCA, when sensors such as A, B, C, and D in FIG. 23 are provided, two sensors form a combination such as A-B, B-C, and C-D and combine ultrasonic wave TOFs to determine the location of the object. When the real objects RM exist outside the parking path on either side as shown in FIG. 23 so that the sensor B, which is the left inner sensor of the vehicle, detects the left object and the sensor C, which is the right-inner sensor of the vehicle, detects the right object, the object coordinates as shown may be generated by a combination of the ultrasonic wave TOFs of the sensors B and C even when no real object exists on the parking path. The present embodiment aims to exclude the ghost coordinates, thereby preventing unnecessary warning or braking during parking when the ghost coordinates, which are the object coordinates of non-existent objects, are generated inside the parking path.

In the determining of whether the objects exist outside the parking path on either side from the inputted object coordinates (S520), it is determined that the objects exist outside the parking path on either side when it is determined that the received object coordinates exist on either side of the vehicle, that the distance between the two object coordinates existing on either side of the vehicle exceeds the vehicle width, and that the two object coordinates existing on either side of the vehicle exist outside the parking path.

Here, it is determined that the object coordinates exist outside the parking path if the real indirect wave TOF is greater than the virtual indirect wave TOF based on the comparison between the virtual indirect wave TOF and the real indirect wave TOF by two sensors (for example, sensors A-B and C-D) on the side of the vehicles among the plurality of sensors disposed in the vehicle width direction.

The direct wave TOF by two sensors on a side of the vehicle is calculated by adding to the indirect wave hTOF a straight line connecting the position of the sensor receiving the indirect wave to the intersection at which a circle having the center at the position of the sensor, of the two sensors, emitting and receiving the direct wave and the radius of direct wave hTOF crosses the outline of the parking path.

On the other hand, it is determined that the object coordinates inside the parking path are ghost coordinates when the real indirect wave TOF is greater than the virtual indirect wave TOF based on the comparison between the virtual indirect wave TOF and real indirect wave TOF by two sensors in the center of the vehicle (for example, sensor B-C).

The virtual indirect wave TOF by the two sensors in the center of the vehicle is calculated by adding to the direct wave hTOF a straight line connecting the position of the sensor receiving the indirect wave to the intersection at which a circle having the center at the position of the sensor, of the two sensors, emitting and receiving the direct wave and the radius of direct wave hTOF crosses the outline of the parking path.

FIG. 23 shows the determining apparatus for obstacles on and around the parking path using ultrasonic waves, the apparatus being configured to implement the first embodiment of the obstacle filtering method on and around the parking path using ultrasonic waves, may be configured to include a data inputting unit 501 receiving an input of coordinates of objects on and around the parking path that the vehicle is to drive on; an either-side object determination unit 502 determining whether the objects exist outside of the parking path on either side from the object coordinates inputted through the data inputting unit 501; an inside object coordinate determination unit 503 determining whether the object coordinates inside the parking exist among the received object coordinates when the either-side object determination unit 502 determines that objects exist outside the parking path on either side; a virtual indirect wave generation unit 504 calculating the virtual indirect wave TOF by the two sensors in the center of the vehicle among the plurality of sensors disposed in the vehicle width direction when the inside object coordinates determination unit 503 determines that the object coordinates inside the parking path exist; a ghost coordinate determination unit 505 determining whether the object coordinates inside the parking path are ghost coordinates based on the comparison between the virtual indirect wave TOF generated by the virtual indirect wave generation unit 504 and the real indirect wave TOF; and a coordinate filtering unit 506 removing the object coordinates inside the parking path when the ghost coordinates determination unit 505 determines that the object coordinates inside the parking path are ghost coordinates.

The either-side object determination unit 502 may be configured to determine that objects exist outside the parking path on either side when it is determined that the object coordinates inputted through the data inputting unit 501 exist on either side of the vehicle, that the distance between the two object coordinates existing on either side of the vehicle exceeds the vehicle width, and that the two object coordinates existing on either side of the vehicle exist outside the parking path.

The either-side object determination unit 502 may be configured to determine that the object coordinates exist outside the parking path when the real indirect wave TOF is greater than the virtual indirect wave TOF based on the comparison between the virtual indirect wave TOF and the real indirect wave TOF by the two sensors on a side of the vehicle among the plurality of sensors disposed in the vehicle width direction.

The virtual indirect wave TOF by the two sensors on a side of the vehicle may be calculated by adding to the direct wave hTOF a straight line connecting the position of the sensor receiving the indirect wave to the intersection at which a circle having the center at the position of the sensor, of the two sensors, emitting and receiving the direct wave and the radius of the direct wave hTOF crosses the outline of the parking path.

The ghost coordinates determination unit 505 may be configured to determine that the object coordinates inside the parking path are ghost coordinates when the real indirect wave TOF is greater than the virtual indirect wave TOF based on the comparison between the virtual indirect wave TOF and the real indirect wave TOF by the two sensors in the center of the vehicle.

The virtual indirect wave TOF by the two sensors in the center of the vehicle may be calculated by adding to the direct wave hTOF a straight line connecting the position of the sensor receiving the indirect wave to the intersection at which the circle having the center at the position of the sensor, of the two sensors, emitting and receiving the direct wave the radius of the direct wave hTOF crosses the outline of the parking path.

Figure 24:
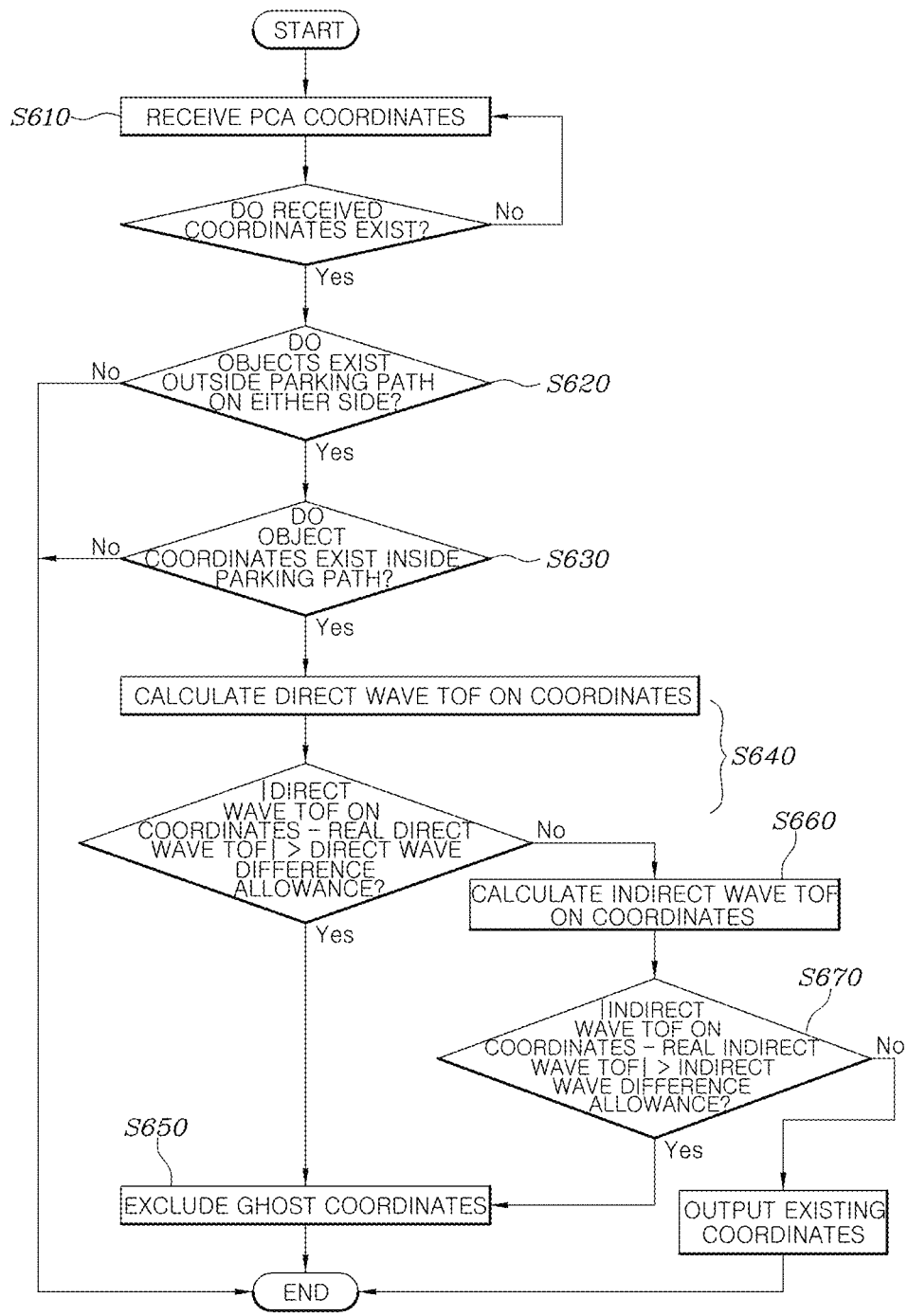
FIG. 24 is a flowchart showing a second embodiment of the obstacle filtering method on and around a parking path using ultrasonic waves.

FIG. 24 shows that a second embodiment of the obstacle filtering method on and around the parking path using ultrasonic waves includes receiving an input of the coordinates of objects on and around the parking path the vehicle is to drive on (S610); determining whether objects exist outside the parking path on either side from the inputted object coordinates (S620); determining whether the object coordinates among the inputted object coordinates exist inside the parking path when the objects exist outside the parking path on either side (S630); determining whether the object coordinates inside the parking path are ghost coordinates based on the comparison between the direct wave hTOF on the coordinates and the real direct wave hTOF, the direct wave hTOF on the coordinates being defined as the distance between the coordinates of the sensor, of the two sensors in the center of vehicle among the plurality of sensors disposed in the vehicle width direction, emitting and receiving the direct wave and the received object coordinates, when the object coordinates inside the parking path exist (S640); and removing the object coordinates inside the parking when the object coordinates inside the parking path are ghost coordinates (S650).

That is, like the first embodiment of the obstacle filtering method on and around the parking path using ultrasonic waves, the present embodiment presents another technology that allows the removal of the ghost coordinates generated in a situation as shown in FIG. 23 and may be used separately from, or in combination with, the first embodiment, thereby allowing more reliable removal of the ghost coordinates formed in the parking path.

When the difference between the direct wave hTOF on the coordinates and the real direct wave hTOF exceeds a predetermined direct wave difference allowance, it is determined that the object coordinates inside the parking path are ghost coordinates.

In a situation shown in FIG. 23, since the difference between the direct wave hTOF actually reflected by the object located outside the parking path and the direct wave hTOF on the coordinates calculated with respect to the object coordinates (ghost coordinates) inside the parking path is to be expected, this allows checking whether the object coordinates inside the parking path are ghost coordinates by setting the direct wave difference allowance to check such difference.

Accordingly, the direct wave difference allowance may be designed through a plurality of experiments and interpretations in accordance with the intent described above.

In addition, the present embodiment may be configured to further include calculating the indirect wave TOF on the coordinates by adding the direct wave hTOF on the coordinates to the distance between the coordinates of the sensor receiving the indirect wave of the two sensors in the center of the vehicle and the received object coordinates when it is determined that the object coordinates inside the parking path are not ghost coordinates based on the comparison between the direct wave hTOF on the coordinates and the real direct wave hTOF (S660) and further determining whether the object coordinates inside the parking path are ghost coordinates based on the comparison between the indirect wave TOF on the coordinates and the real indirect wave TOF (S670).

That is, even when it is determined that the object coordinates inside the parking path are not ghost coordinates based on the comparison between the direct wave hTOF on the coordinates and the real direct wave hTOF, whether the object coordinates inside the parking path are ghost coordinates is further determined based on the comparison between the indirect wave TOF on the coordinates obtained as described above and the real indirect wave TOF.

Of course, when the difference between the indirect wave TOF on the coordinates and the real indirect wave TOF exceeds the indirect wave difference allowance, it is determined that the object coordinates inside the parking path are ghost coordinates.

The indirect wave difference allowance may be designed through a plurality of experiments and interpretations to the extent that the real indirect wave TOF and the indirect wave TOF on the coordinates for the ghost coordinates may be distinguished in accordance with the intent described above.

In the present embodiment, the removing of the object coordinates inside the parking path (S650) is performed when it is determined that the object coordinates inside the parking path are ghost coordinates, and the existing coordinates inputted from a parking assist device such as the PCA are outputted as they are when it is determined that the object coordinates inside the parking path are not ghost coordinates, so that a warning device, braking device, or the like may be driven.

Figure 33:
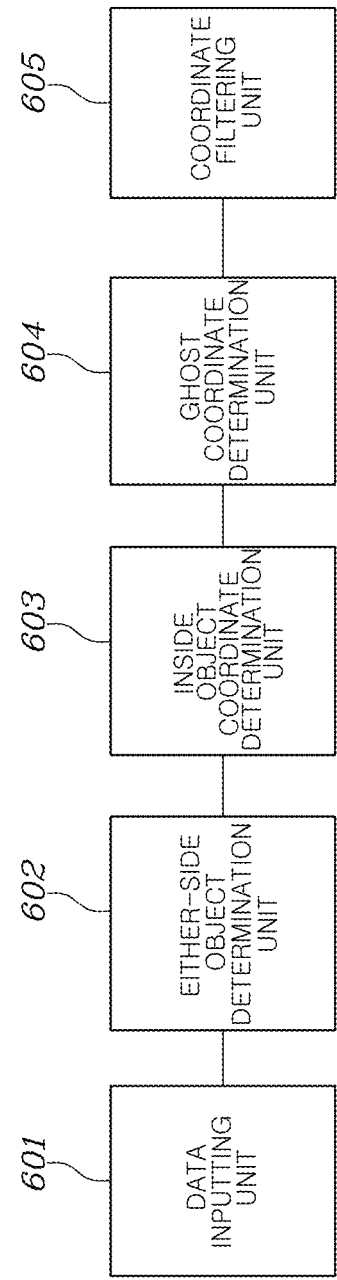
FIG. 33 is a view showing an embodiment of determining apparatus for obstacles on and around a parking path using ultrasonic waves, the apparatus being configured to implement the second embodiment of the obstacle filter method on and around the parking path using ultrasonic waves as shown in FIG. 24.

FIG. 33 shows that the determining apparatus for obstacles on and around the parking path using ultrasonic waves, the apparatus being configured to implement a second embodiment of the obstacle filtering method on and around the parking path using ultrasonic waves, may be configured to include a data inputting unit 601 receiving an input of the coordinates of objects on and around the parking path that the vehicle is to drive on; an either-side object determination unit 602 determining whether objects exist outside the parking path on either side from the object coordinates inputted through the data inputting unit 601; an inside object coordinate determination unit 603 determining whether object coordinates inside the parking path exist among the inputted object coordinates when the either-side object determination unit 602 determines that object exists outside the parking path on either side; a ghost coordinate determination unit 604 determining whether the object coordinates inside the parking path are ghost coordinates based on the comparison between the direct wave hTOF on the coordinates and the real direct wave hTOF, the direct wave hTOF on the coordinates being defined as the distance between the coordinates of the sensor, of the two sensors in the center of the vehicle among the plurality of sensors disposed in the vehicle width direction, emitting and receiving the direct wave and the received object coordinates when the inside object coordinate determination unit 603 determines that the object coordinates inside the parking path exists; and a coordinate filtering unit 605 removing the object coordinates inside the parking path when the ghost coordinates determination unit 604 determines that the object coordinates inside the parking path are ghost coordinates.

The ghost coordinates determination unit 604 may be configured to determine that the object coordinates inside the parking path are ghost coordinates when the difference between the direct wave hTOF on the coordinates and the real direct wave hTOF exceeds the predetermined direct wave difference allowance.

In addition, the ghost coordinates determination unit 604 may be configured to calculate the indirect wave TOF on the coordinates by adding the direct wave hTOF on the coordinates to the distance between the coordinates of the sensor receiving the indirect wave of the two sensors in the center of the vehicle and the received object coordinates when it is determined that the object coordinates inside the parking path are not ghost coordinates based on the comparison between the direct wave hTOF on the coordinates and the real direct wave hTOF and further determining whether the object coordinates inside the parking path are ghost coordinates based on the comparison between the indirect wave TOF on the coordinates and the real indirect wave TOF.

In addition, the ghost coordinates determination unit 604 may be configured to determine that the object coordinates inside the parking path are ghost coordinates when the difference between the indirect wave TOF on the coordinates and the real indirect wave TOF exceeds the indirect wave difference allowance.

Figure 25:
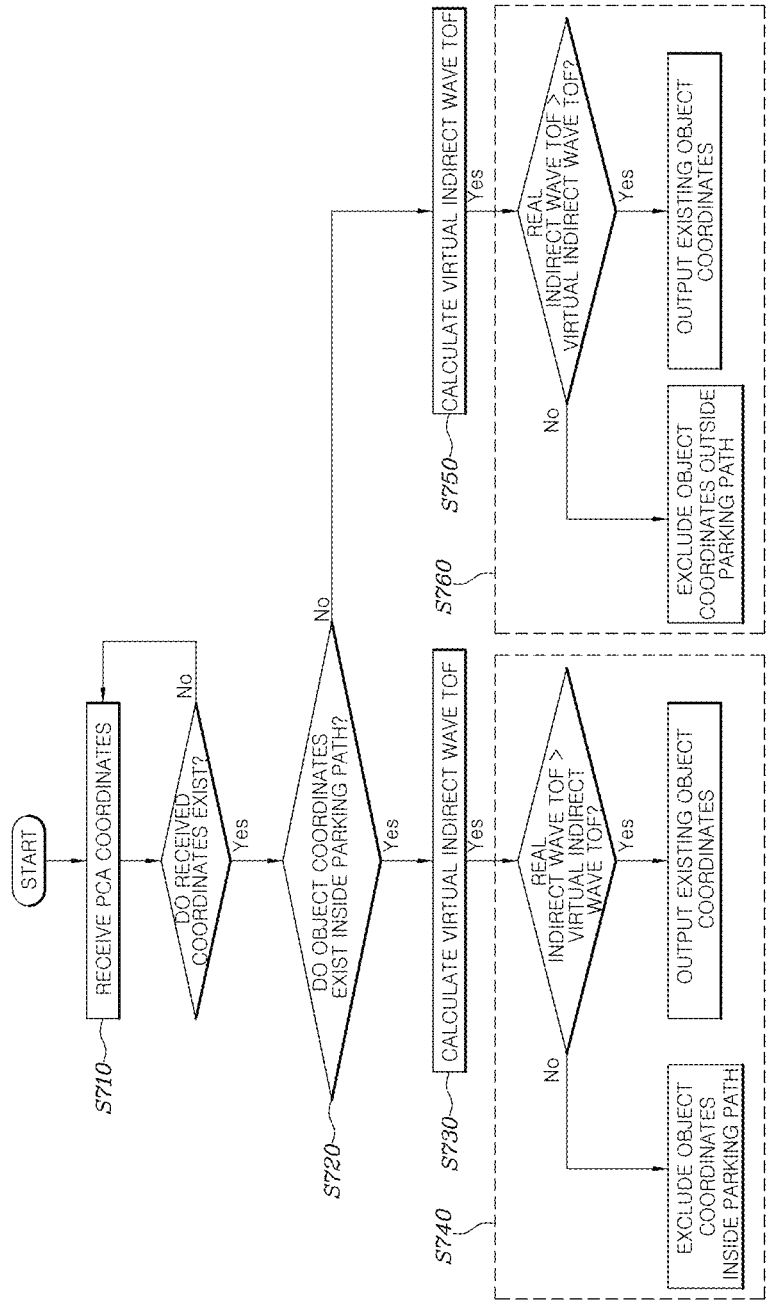
FIG. 25 is a flowchart showing a third embodiment of the obstacle filtering method on and around a parking path using ultrasonic waves.

FIG. 25 shows that a third embodiment of the obstacle filter method on and around the parking path using ultrasonic waves includes receiving an input of the coordinates of objects on and around the parking path that the vehicle is to drive on (S710); determining whether the inputted object coordinates are coordinates inside the parking path (S720); calculating the virtual indirect wave TOF by two sensors on a side of the vehicle when the inputted object coordinates are coordinates inside the parking path (S730); and outputting the inputted object coordinates as valid coordinates when it is determined that a source object of the inputted object coordinates is an object inside the parking path and removing the inputted object coordinates when it is determined that the source object is an object outside the parking path, based on the comparison between the virtual indirect wave TOF and the real indirect wave TOF (S740).

That is, when it is determined that the inputted object coordinates are located in the parking path due to an error of the parking assist device, a noise, or the like even though the source object RM of the inputted object coordinates is actually located outside the parking path, whether the source object is located in the parking path is determined based on the comparison between the virtual indirect wave TOF calculated as described above and the real indirect wave TOF, and the location of the source object is finally determined according to the comparison result between the virtual indirect wave TOF and the real indirect wave TOF.

In addition, the present embodiment further includes calculating the virtual indirect wave TOF by two sensors on a side of the vehicle when the inputted object coordinates are not coordinates inside the parking path (S750) and outputting the inputted object coordinates as valid coordinates when it is determined that the source object of the inputted object coordinates is an object outside the parking path and removing the inputted object coordinates and determining that the source object is an object inside the parking path when it is determined that the source object is an object inside the parking path, based on the comparison between the virtual indirect wave TOF and the real indirect wave TOF (S760).

Figure 26:
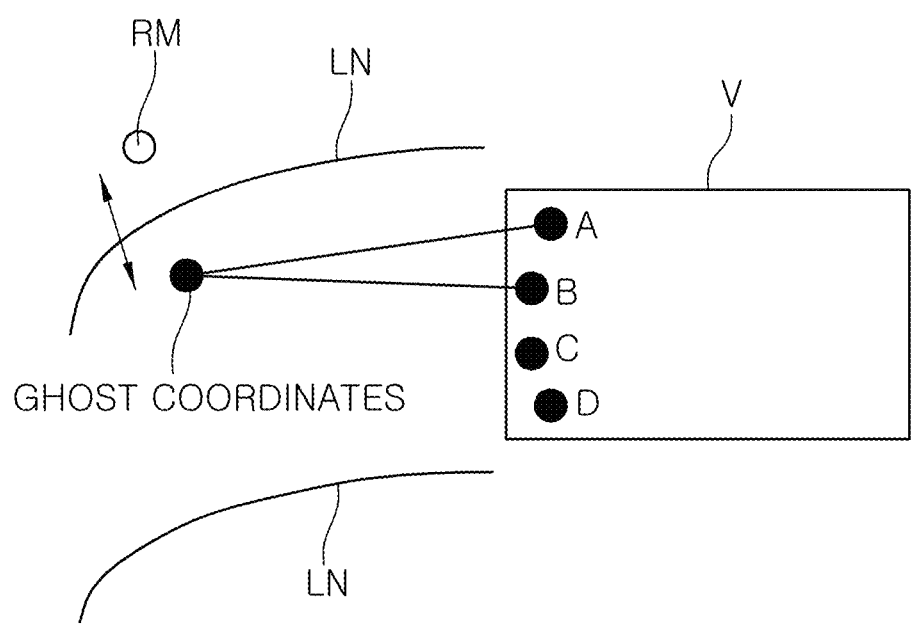
FIG. 26 is a view illustrating a case where a real object exists outside a parking path and ghost coordinates are located inside the parking path.
Figure 27:
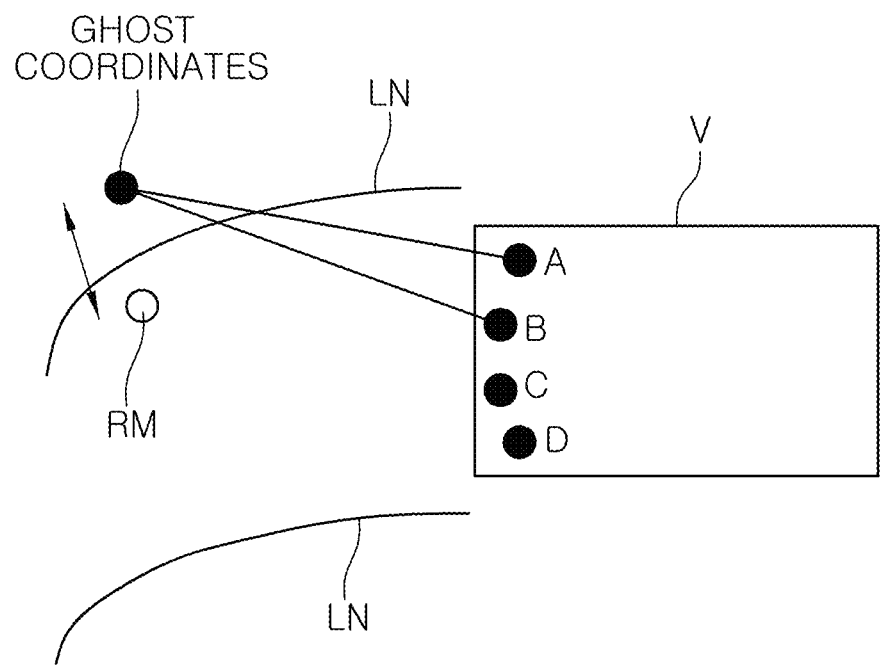
FIG. 27 is a view illustrating a case where a real object exists inside a parking path and ghost coordinates are located outside the parking path.

That is, in contrast to the situation in FIG. 26, when the inputted object coordinates are located outside the parking path due to various causes such as noise and the like even though the source object RM of the inputted object coordinates are actually located inside the parking path as in FIG. 27, whether the source object is actually located inside the parking path is finally determined based on the comparison between the virtual indirect wave TOF calculated as described above and the real indirect wave TOF.

Accordingly, even when wrong object coordinates are inputted due to various causes in a parking assist device such as the conventional PCA and the like, an error-free correction may be made by the obstacle filtering method described above.

That is, when it is determined that the source object of the inputted object coordinates is an object outside the parking path based on the comparison between the virtual indirect wave TOF and the real indirect wave TOF even when the inputted object coordinates are coordinates in the parking path, the inputted object coordinates are excluded from the coordinates for driving the parking distance warning (PDW) device or the braking device.

Of course, when it is determined that the source object of the inputted object coordinates is an object inside the parking path based on the comparison between the virtual indirect wave TOF and the real indirect wave TOF even when the inputted object coordinates are not coordinates in the parking path, the inputted object coordinates are included in the coordinates for driving the parking distance warning (PDW) device or the braking device.

Accordingly, the appropriate operational reliability of the parking distance device or braking device of the vehicle is secured, and unwanted malfunctions may be effectively prevented.

Figure 34:
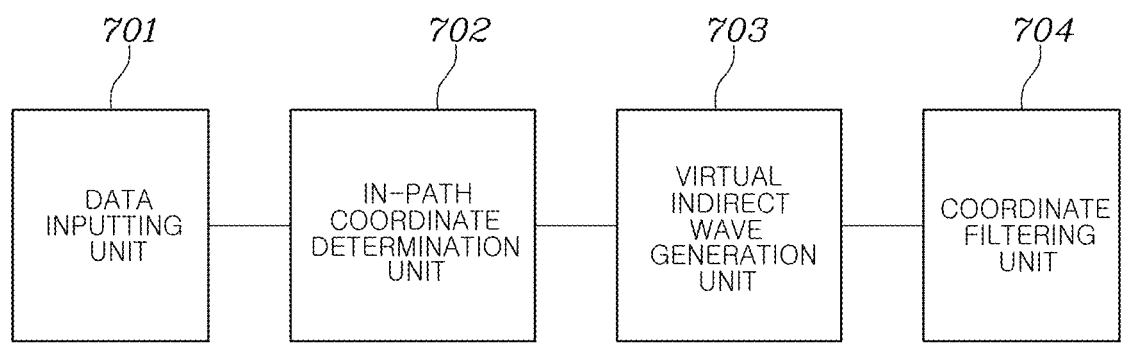
FIG. 34 is a view showing an embodiment of determining apparatus for obstacles on and around a parking path using ultrasonic waves, the apparatus being configured to implement the third embodiment of the obstacle filter method on and around the parking path using ultrasonic waves as shown in FIG. 25.

FIG. 34 shows that the determining apparatus for obstacles on and around the parking path using ultrasonic waves, the apparatus being configured to implement the third embodiment of the obstacle filtering method on and around the parking path using ultrasonic waves, may be configured to include a data inputting unit 701 receiving an input of the coordinates of objects on and around the parking path that the vehicle is to drive on; an in-path coordinate determination unit 702 determining whether the object coordinates inputted through the data inputting unit 701 are coordinates in the parking path; a virtual indirect wave generation unit 703 calculating the virtual indirect wave TOF by two sensors on the side of the vehicle when the in-path coordinate determination unit 702 determines that the object coordinates inputted through the data inputting unit 701 are coordinates in the parking path; and a coordinate filtering unit 704 outputting the inputted object coordinates as valid coordinates when it is determined that the source object of the inputted object coordinate is an object inside the parking path and removing the inputted object coordinate when it is determined that the source object is an object outside the parking path, based on the comparison between the virtual indirect wave TOF generated by the virtual indirect wave generation unit 703 and the real indirect wave TOF.

The virtual indirect wave generation unit 703 may be configured to calculate the virtual indirect wave TOF by the two sensors on a side of the vehicle when the in-path coordinate determination unit 702 determines that the object coordinates inputted through the data inputting unit 701 are not coordinates in the parking path, and the coordinate filtering unit 704 outputs the inputted object coordinates as valid coordinates when it is determined that the source object of the inputted object coordinates is an object outside the parking path and excludes the inputted object coordinates and determines that the source object is an object in the parking path when it is determined that the source object is an object inside the parking path, based on the comparison between the virtual indirect wave TOF and the real indirect wave TOF.

In addition, the coordinate filtering unit 704 may be configured to exclude the inputted object coordinates from the coordinates for driving a parking distance warning (PDW) device or a braking device when it is determined that the source object of the inputted object coordinates is an object outside the parking path based on the comparison between the virtual indirect wave TOF and the real indirect wave TOF even when the inputted object coordinates are coordinates in the parking path.

In addition, the coordinate filtering unit 704 may be configured to include the inputted object coordinate in the coordinates for driving the parking distance warning (PDV) device or the parking device when it is determined that the source object of the inputted object coordinate is an object inside the parking path based on the comparison between the virtual indirect wave TOF and the real indirect wave TOF even when the inputted object coordinates are not coordinates in the parking path.

The specific embodiments of the present invention are illustrated and described, but it will be self-evident to those skilled in the art that the present invention may be improved upon and modified in various ways within the scope not departing from the technical spirit of the present invention provided by the patent claims below.

What is claimed is:

1. A determining method for obstacles on and around a parking path that a vehicle is to move on, the method comprising:
    determining whether an ultrasonic noise exists in time of flights (TOFs) of ultrasonic waves reflected by an object and received;
    generating a virtual object on an outline of the parking path based on a received ultrasonic wave time of flight (TOF) when no ultrasonic noise exists;
    generating a virtual indirect wave TOF using the virtual object; and
    determining whether the object is located inside or outside the outline of the parking path by comparing a real indirect wave TOF, which is an indirect wave TOF among the received ultrasonic wave TOFs, to the virtual indirect wave TOF,
    wherein, in determining whether an ultrasonic noise exists, it is determined that no ultrasonic noise exists when both a direct wave TOF and the indirect wave TOF exist and neither a dynamic noise nor a static noise exists in the received ultrasonic wave TOFs, and
    wherein it is determined that the dynamic noise is generated when:

$d(\text{direct wave } h\text{TOF}) > Vdt$, where:

direct wave $h\text{TOF} = \text{direct wave TOF}/2$, $d(\text{direct wave } h\text{TOF}) = \text{direct wave } h\text{TOF}_{t=n} - \text{direct wave } h\text{TOF}_{t=n-1}$ [m], V: vehicle speed, and
    dt: ultrasonic update cycle [ms].

2. The method of claim 1, wherein it is determined that the static noise is generated when:

$|\text{direct wave } h\text{TOF} - \text{indirect wave } h\text{TOF}| > \text{distance between sensors}/2$ where:

$h\text{TOF} = \text{TOF}/2$ and distance between sensors: distance between a sensor emitting and receiving a direct wave and a sensor receiving an indirect wave.

3. The method of claim 1, wherein the virtual object is generated at an intersection in which a circle having a center at a position of a sensor emitting and receiving a direct wave and a radius of a direct wave hTOF crosses the outline of the parking path.

4. The method of claim 3, wherein the virtual indirect wave TOF is calculated as a sum of a straight line connecting a position of the sensor emitting and receiving the direct wave to the virtual object and a straight line connecting the virtual object to a position of a sensor receiving the indirect wave.

5. The method of claim 4, wherein, in determining whether the object is located inside or outside the outline of the parking path, when the sensor emitting and receiving the direct wave is located on an outer side of the parking path, it is determined that the object is located outside the outline of the parking path if the real indirect wave TOF is greater than the virtual indirect wave TOF and that the object is located inside the outline of the parking path if the real indirect wave TOF is equal to or less than the virtual indirect wave TOF.

6. The method of claim 1, wherein a plurality of sensors mounted in the vehicle sequentially emit ultrasonic waves and the step of determining whether the ultrasonic noise exists to the step of determining whether the object is located inside or outside the outline of the parking path are repeatedly performed by two adjacent sensors each time the respective sensors emit the ultrasonic waves.

7. A determining apparatus for obstacles on and around a parking path that a vehicle is to move on, the apparatus comprising:
    a noise determination unit determining whether an ultrasonic noise exists in time of flights (TOFs) of ultrasonic waves reflected by an object and received;
    a virtual object generation unit generating a virtual object on an outline of the parking path based on the received ultrasonic wave time of flight (TOF) when the noise determination unit determines that no ultrasonic noise exists;
    a virtual indirect wave generation unit generating a virtual indirect wave TOF using the virtual object generated by the virtual object generation unit; and
    an object location determination unit determining whether the object is located inside or outside the outline of the parking path by comparing a real indirect wave TOF, which is an indirect wave TOF among the received ultrasonic wave TOFs, to a virtual indirect wave TOF generated by the virtual indirect wave generation unit,
    wherein the noise determination unit includes a dynamic noise determination unit and a static noise determination unit and determines that no ultrasonic noise exists when both a direct wave TOF and the indirect wave TOF exist and neither a dynamic noise nor a static noise exists in the received ultrasonic wave TOFs, and
    wherein the dynamic noise determination unit is configured to determine that the dynamic noise is generated when:

$d(\text{direct wave } h\text{TOF}) > Vdt$ where:

direct wave $h\text{TOF} = \text{direct wave TOF}/2$, $d(\text{direct wave } h\text{TOF}) = \text{direct wave } h\text{TOF}_{t=n} - \text{direct wave } h\text{TOF}_{t=n-1}$ [m], V: vehicle speed, and dt: ultrasonic update cycle [ms].

8. The apparatus of claim 7, wherein the static noise determination unit is configured to determine that the static noise is generated when:

$$|\text{direct wave } h\text{TOF} - \text{indirect wave } h\text{TOF}| > \text{distance between sensors}/2 \quad (5)$$

Where:
  distance between sensors: distance between a sensor emitting and receiving the direct wave and a sensor receiving the indirect wave.

9. The apparatus of claim 7, wherein the virtual object generation unit generates the virtual object at an intersection in which a circle having a center at a position of a sensor emitting and receiving a direct wave and a radius of a direct wave hTOF crosses the outline of the parking path.

10. The apparatus of claim 9, wherein the virtual indirect wave generation unit calculates the indirect wave TOF as a sum of a straight line connecting a position of the sensor emitting and receiving the direct wave to the virtual object and a straight line connecting the virtual object to a position of a sensor receiving the indirect wave.

11. The apparatus of claim 10, wherein, when the sensor emitting and receiving the direct wave is located on an outer side of the parking path, the object location determination unit determines that the object is located outside the outline of the parking path if the indirect wave TOF is greater than the virtual indirect wave TOF and that the object is located inside the outline of the parking path if the real indirect wave TOF is equal to or less than the virtual indirect wave TOF.

* * * * *